United States Patent
Seko

(10) Patent No.: US 7,489,406 B2
(45) Date of Patent: Feb. 10, 2009

(54) OPTICAL LENS SYSTEM AND POSITION MEASUREMENT SYSTEM USING THE SAME

(75) Inventor: Yasuji Seko, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/837,708

(22) Filed: Aug. 13, 2007

(65) Prior Publication Data
US 2007/0291278 A1    Dec. 20, 2007

Related U.S. Application Data

(62) Division of application No. 11/013,390, filed on Dec. 17, 2004, now Pat. No. 7,274,461.

(30) Foreign Application Priority Data

May 20, 2004    (JP)    ............... 2004-151102

(51) Int. Cl.
*G01B 11/02* (2006.01)
*G02B 1/10* (2006.01)
*G02B 13/22* (2006.01)

(52) U.S. Cl. .................. 356/498; 359/581; 359/663

(58) Field of Classification Search ............... 356/498; 359/577, 581, 642, 663, 708, 717, 741
See application file for complete search history.

(56) References Cited

U.S. PATENT DOCUMENTS

| 4,181,409 | A | 1/1980 | Whitney et al. |
| 5,523,884 | A * | 6/1996 | Jewell et al. ............... 359/641 |
| 6,005,703 | A | 12/1999 | Maddox et al. |
| 6,831,794 | B2 | 12/2004 | Schuster et al. |
| 6,876,494 | B2 * | 4/2005 | Ishikawa et al. ............ 359/618 |
| 6,985,236 | B2 | 1/2006 | Seko et al. |
| 7,009,713 | B2 | 3/2006 | Seko et al. |

FOREIGN PATENT DOCUMENTS

| JP | 4-8724 B2 | 2/1992 |
| JP | 10-031213 A | 2/1998 |
| JP | 2004-28977 A | 1/2004 |

* cited by examiner

*Primary Examiner*—Michael A Lyons
(74) *Attorney, Agent, or Firm*—Sughrue Mion, PLLC

(57) ABSTRACT

An optical lens system includes a lens surface capable of forming concentric interference patterns on an object as if light emitted from a single light source were virtually emitted from two or more light sources within a plane containing an optical axis of the single light source.

14 Claims, 17 Drawing Sheets

INTERFERENCE PATTERNS

OPTICAL LENS SYSTEM AND POSITION MEASUREMENT SYSTEM USING THE SAME

CROSS REFERENCE TO RELATED APPLICATIONS

This is a Divisional of application Ser. No. 11/013,390 filed Dec. 17, 2004, which claims the benefit of Japanese Patent Application No. 2004-151102 filed on May 20, 2004. The disclosures of the prior applications, including specification, claims, drawings and abstract are incorporated herein by reference in their entirety.

BACKGROUND OF THE INVENTION

1. Field of the Invention

The present invention relates to an optical lens system suitable for use in forming a concentric interference pattern, as well as to a positional measurement system for measuring a one-dimensional, two-dimensional, or three-dimensional position of an object by utilization of the concentric interference pattern. In addition to being utilized for positional measurement, the present invention can also be utilized as, e.g., a pointer, a device for inputting a distance image, and a positional information system.

2. Description of the Related Art

Measuring the orientation of an object is generally not easy. For example, a method for measuring the pointing direction of a pointer includes a method for photographing, through use of two cameras, two LED light sources attached to the pointer, computing positions of the respective LED light sources in accordance with the principle of triangulation, and determining the orientation of the pointer. However, the actual pointer has a length of about 10 cm. When the cameras and the pointer are spaced several meters apart from each other, positional accuracy becomes deteriorated. Hence, the direction of the pointer cannot be measured accurately. In the case of triangulation, two or more cameras must be able to photograph a single point at all times. In reality, in some cases one of the cameras is blocked by another of the cameras, and performing measurement at all times is not easy. In the case of triangulation using two or more cameras, positions of the cameras must be corrected after the axial directions of the respective cameras and the intervals between the cameras have been arranged accurately. This raises a problem of a round of these operations being troublesome.

Another currently-proposed technique is for detecting, through use of a CCD camera attached to a projector, a point indicated by a laser pointer and moving a cursor to coordinates of that point. However, this method can be utilized for only the case of a projection-type display and has a problem of being unsuitable for an ordinary display and lacking general versatility. Yet another method is a pointer of gyro type. This method is for measuring the amount of three-dimensional rotational movement of the gyro pointer by utilization of the gyro serving as an angle sensor and sending the amount of movement to a computer by wireless communication, to thus move the cursor. However, this method is for measuring only the amount of rotational movement of the gyro pointer. The direction of a vector actually indicated by a human is totally irrelevant to the position of the cursor, thereby raising a problem of difficulty in ascertaining an indicated position. There is also proposed still another method for measuring the three-dimensional position of a pointer by utilization of light or ultrasonic waves, to thus input the three-dimensional position into a computer. However, in any case, the direction of a vector indicated by the pointer is unknown, and the "function of an indicating point which is an extension of a finger or a hand" cannot be fulfilled.

An optical interference method utilizing optical interference is often used as a method for accurately measuring a position. The optical interference measurement method includes a method for splitting the light exiting a laser light source into two beams by a beam splitter. One of the split beams is radiated on an object, and the other beam is emitted to a mirror as reference light so as to return along the original light path. The light reflected from the object is superimposed on the reference light, to thus cause interference. This method yields an advantage of the ability to measure a position and displacement by resolving power which is equal to or less than a wavelength. However, this method requires optical components, such as a beam splitter or a reflection mirror, and suffers a problem of involving a large number of components and a high cost. When an optical interference measurement method is applied to an object which moves, there is a necessity to automatically trace an object and continuously radiate light, thereby yielding a disadvantage of a further increase in cost.

A laser gauge interferometer capable of reducing the number of components is described in JP-B-4-8724.

The interferometer uses a gradient index lens. This gradient index lens is formed such that the refractive index of an optical glass rod becomes lower as the rod departs from the center axis by ion diffusion. A gold-evaporated semi-transparent mirror is formed on an entrance-side end of the gradient index lens and an exit-side end of the same. Interference arises between direct light emitted from a laser and reflected light which again enters the gradient index lens after having undergone reflection on a semi-transparent mirror of the gradient index lens and reflection on the exit-end surface of the laser. The number of components of this interferometer can be reduced to a certain extent in comparison with the previously-described optical interferometer. However, a gradient index lens must be prepared, and a semi-transparent mirror must be formed. Hence, the interferometer cannot be said to be satisfactory in terms of cost.

Another optical interference measurement method employs a diffraction grating or a slit. In order to cause optical interference through use of a diffraction grating or a slit, a diffraction grating or a slit must be formed at pitches essentially equal to a wavelength, and hence micromachining is required. Therefore, there arises a problem of components being expensive. In contrast, when a slit is used, the quantity of light passing through the slit is substantially diminished even when the slit is exposed to a laser beam, and there arises a problem of difficulty being encountered in utilizing the slit in an ordinary environment.

An optical projector is attached to an object as means for measuring the orientation of the object. A concentric circular pattern is projected on a wall from the projector. The concentric patterns are detected by sensors, such as image sensors, provided on the wall, thereby computing the center of the concentric circles. Thus, the orientation of the object can be measured. In this case, focus must be obtained such that an interference pattern does not become blurred in accordance with a distance between the optical projector and the wall. When the object moves dynamically, there arises a problem of focusing lagging behind movement. An automatic focusing mechanism, or the like, is also required, which in turn adds to costs.

As mentioned above, under present circumstances, there is no pertinent means for accurately measuring the orientation and direction of the moving object.

According to a conventional method for photographing an object with two cameras which act as means for measuring the orientation of the object, the positional accuracy of measurement is low, and the direction of the object cannot be measured accurately. Moreover, processes for arranging two cameras and correcting positions of the cameras are troublesome. A conventional optical interference technique which enables highly-accurate positional measurement suffers problems, that is, high costs of components of an interference optical system, high precision required for assembly, a larger number of components, a large number of assembly steps, and the technique being unsuitable for positional measurement of a moving body. Moreover, the method for projecting a concentric circular pattern by a projector suffers problems, that is, consumption of time to obtain focusing, a bulky size, a heavy weight, and high power consumption.

SUMMARY OF THE INVENTION

According to an aspect of the present invention, an optical lens system includes a lens surface capable of forming concentric interference patterns on an object as if light emitted from a single light source were virtually emitted from two or more light sources within a plane containing an optical axis of the single light source.

According to another aspect of the present invention, an optical lens system includes a lens to render light emitted from a light source parallel to an optical axis, and a lens surface having a curvature radius which continuously changes an outgoing direction of light passing through an area of the lens from the optical axis to a rim of the lens.

According to yet another aspect of the present invention, a positional measurement system includes a light source to emit a laser beam, an optical lens system which forms concentric interference patterns by the laser beam passing through different optical paths, a sensor to detect the interference patterns, and a computing device to determine the position of at least one of the light source, the sensor, and the interference patterns, on the basis of a detection signal output from the sensor.

According to still another aspect of the present invention, a pointer measurement system includes a light source module having a light source to emit a laser beam, and an optical lens system to form concentric interference patterns by the laser beam passing through different optical paths, a sensor to detect the interference patterns, and a computing device to determine the position of at least one of the light source, the sensor, and the interference patterns on the basis of a detection signal output from the sensor. Preferably, the position of an object indicated by the light source module is measured by projecting the interference patterns on the object, detecting the interference patterns through use of the sensor, and computing the position of the common center of the interference patterns through use of the computing device.

According to yet another aspect of the present invention, a positional data system includes a light source module having a light source to emit a laser beam, and an optical lens system to form concentric interference patterns by the laser beam passing through different optical paths, a sensor to detect the interference patterns, and a computing device to determine the position of at least one of the light source, the sensor, and the interference positions on the basis of a detection signal output from the sensor. Preferably, the light source module is provided indoors in a plurality of numbers, and information about a direction in which a moving object to move indoors is headed and a position of the moving object within a range where the concentric interference patterns projected by the adjacent light source modules overlap each other.

According to still another aspect of the present invention, an optical space communication device includes a light source module having a light source to emit a laser beam and an optical lens system to form concentric interference patterns by the laser beam passing through different optical paths, a sensor to detect the interference patterns, and a computing device to subject a detection signal output from the sensor to arithmetic operation. Preferably, an optical transmitter for optical space communication is provided with the light source or the sensor, the position of an optical receiver for optical space communication is specified on the basis of positional information on at least one of the light source and the sensor, and an optical signal of the optical transmitter for optical space communication is emitted in the specified direction.

BRIEF DESCRIPTION OF THE DRAWINGS

Embodiments of the present invention will be described in detail based on the following figures, wherein.

DETAILED DESCRIPTION OF THE INVENTION

An optical lens system of the present invention will first be described hereinbelow. Subsequently, a positional measurement system using this optical lens system will be described. Here, the optical lens system is constituted of one or plural optical lenses.

At the outset, the principle of the lens which forms the concentric interference pattern (interference stripes) will be described in relation to the optical lens system of the present invention. A method for forming a concentric interference pattern by use of a lens is roughly classified into two types. In a method of one type, light having passed through a half of the lens divided by a cross section where the optical axis of the lens exists and light having passed through the remaining half of the lens cause interference on the object. In the method of the other type, light having passed through half of the lens and light having passed through the other half of the lens induce interference on the cross section where the optical axis of the lens exists.

Figure 1A:
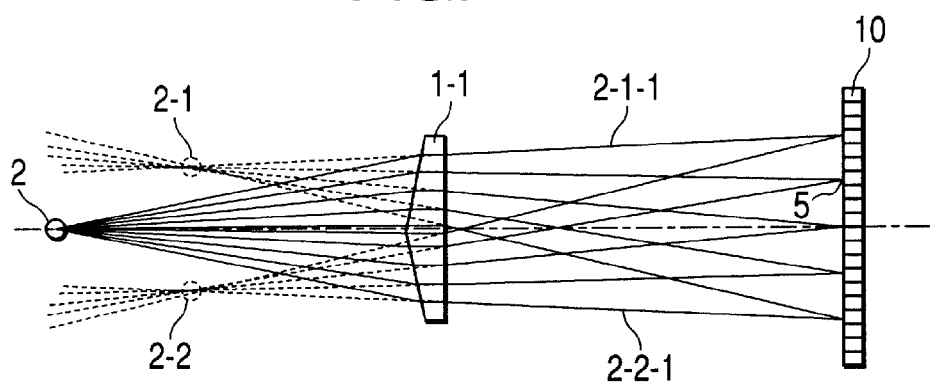
FIGS. 1A and 1B are views for describing the principle that light beams having passed through upper and lower halves of an optical lens cause interference.
Figure 1B:
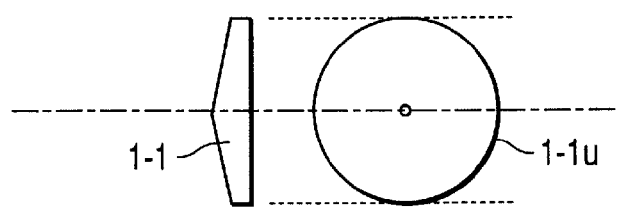

FIGS. 1A, 1B are views for describing the principle that light beams having passed through upper and lower halves of an optical lens cause interference. FIG. 1A shows a cross-section of a lens taken along a plane passing through the optical axis of the optical lens, and FIG. 1B shows a cross-sectional view and a front view of a conical optical lens. As illustrated, an optical lens 1-1 has a conical light entrance surface, and a light exit surface of the optical lens 1-1 is formed from a flat surface. An optical lens 1-1u is a front view acquired when the lens 1-1 is viewed from the direction of the light source. As mentioned above, the optical lens 1-1 has a lens surface whose singular point of shape is located on the optical axis or in the vicinity of the optical axis.

The light emitted from a laser light source 2 enters the optical lens 1-1. The light having passed through an area of the lens which is above the optical axis is radiated on an object 10 by way of a beam locus 2-1-1. Similarly, the light having passed through an area of the lens which is below the optical axis is radiated on the object 10 by way of a beam locus 2-2-1. The light having reached a single point (a point of interference) 5 on the object 10 is a laser beam emitted from the same light source and hence causes interference. Thus, the laser beam emitted from a single light source is virtually projected on the object within the plane where the optical axis exists as if the laser beam were emitted from two light sources 2-1, 2-1.

The optical path length of an optical path 2-1-1 from the light source 2 to the point of interference 5 is assumed to be L1, and the optical path length of an optical path 2-2-1 from the light source 2 to the point of interference 5 is assumed to be L2. A difference between these optical path lengths is assumed to be ΔL. Further, the light having reached the point of interference 5 by way of the optical path 2-1-1 and the light having reached the point of interference 5 by way of the optical path 2-2-1 are assumed to have the same intensity. Under these assumptions, an electric field intensity I of the light achieved at the point of interference 5 corresponds to a function of the optical path lengths L1, L2 and a wavelength and is expressed by the following equation.

$$E = \exp(2\pi L1/\lambda \cdot i) + \exp(2\pi L2/\lambda \cdot i) = 2\cos(\pi \cdot \Delta L/\lambda) \cdot \exp(i\pi(L1+L2)/\lambda) \quad (1)$$

where "i" denotes an imaginary number, and λ is a wavelength of a laser beam. The optical path length is a value determined in consideration of a refraction factor of air and a refraction factor of a lens. The intensity I of light is expressed by the square of electric field intensity.

$$I=|E|^2 \quad (2)$$

Optical interference can be simulated with a computer by application of this equation.

Figure 2:
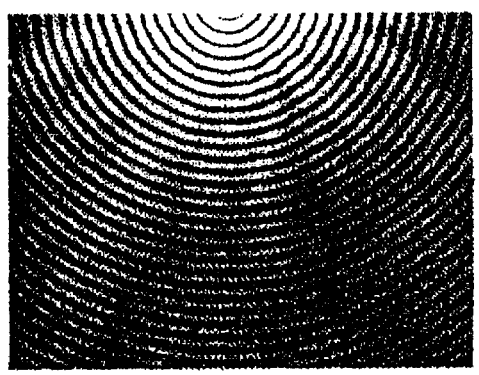
FIG. 2 is a view showing an interference pattern acquired when an interference pattern is projected directly on a CCD and photographed.

The optical lens 1-1 has a shape symmetrical about the optical axis, and hence a concentric interference film centered on the optical axis is presumed to have been formed. A check was made as to whether or not an interference pattern is actually formed, through use of a conical lens. The result of check is shown in FIG. 2. FIG. 2 is a view showing an interference pattern acquired when an interference pattern is projected directly on the CCD and photographed. At this time, the CCD measured about 12 mm×10 mm, and a distance from the lens to the CCD was 60 cm. The conical lens has a diameter of Φ16 mm, and the height of the conical section was 1.5 mm. The overall thickness of the conical lens, including the height of the conical section, was set to 5 mm. A distance from the top of the conical lens to the laser light source was set to 1 to 2 mm or thereabouts. The result of check shows that a concentric circle, such as that shown in FIG. 2, can be actually formed. Here, the conical lens serves as superimposing a laser beam on the object.

Figure 3:
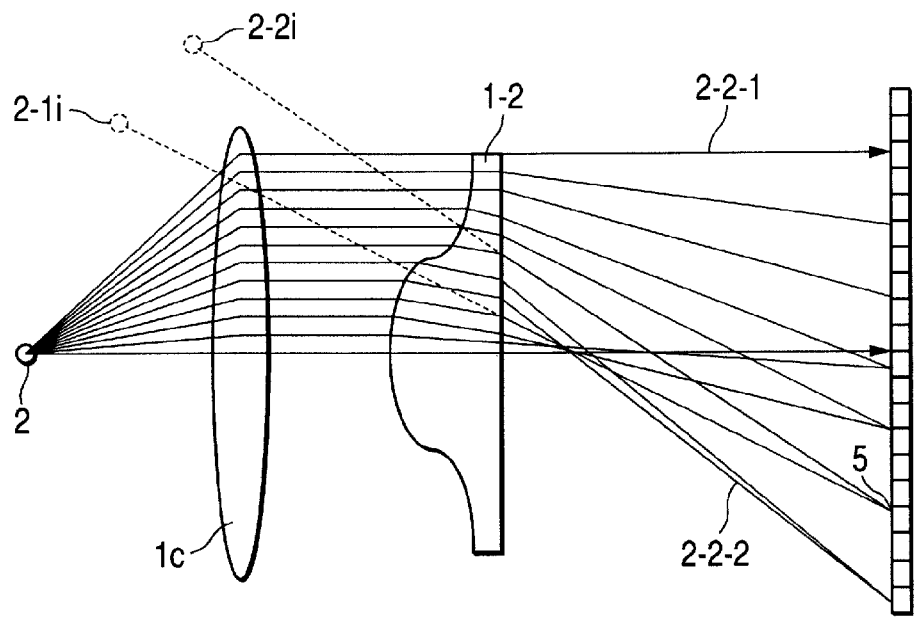
FIG. 3 is a view for describing the principle that light beams having passed through an upper half of the optical lens cause interference.

FIG. 3 is a view for describing the principle that the light beams having passed through the upper half of the optical lens cause interference. An optical-axis portion and an outer rim portion of the optical lens 1-2 shown in FIG. 3 each have a surface perpendicular to the optical axis. The laser beam emitted from the laser light source 2 is collimated by a collimator lens 1c, and the thus-collimated light enters a lens 1-2. The light having passed through the optical axis portion travels straight, but the light having passed through an area of the lens located slightly above the optical axis is refracted and travels downward. The higher the location through which the light travels, the greater the refraction of the light. However, the light again returns to a light beam parallel to the optical axis after having been most strongly refracted at a certain point. As shown in FIG. 3, light which reaches the same point 5 on the object exists in the lens which causes the light to behave as mentioned above, thereby inducing interference. Since the lens has a shape symmetrical about the optical axis, the interference pattern assumes the shape of a concentric circle centered on the optical axis. Even in the lens of this case, light can be considered to have reached the point of interference from two virtual light sources 2-1i, 2-2i within the plane where the optical axis passing through the points of interference exists. In this case, positions of the virtual light sources are moved in accordance with the respective points of interference.

First Embodiment

Figure 4A:
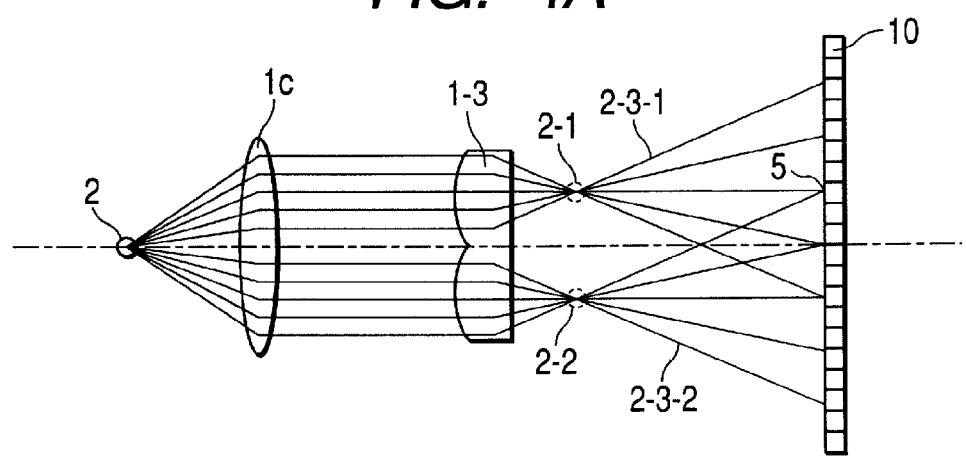
FIGS. 4A and 4B are views for showing an embodiment of an optical lens system where light beams having passed through upper and lower halves of the lens form concentric interference patterns.
Figure 4B:
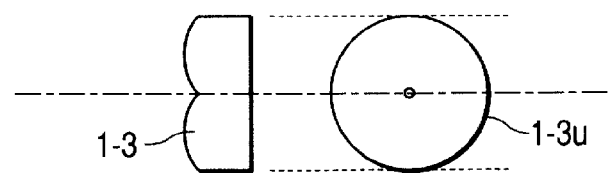

FIGS. 4A, 4B are views showing a first embodiment of the optical lens system where a concentric interference pattern is formed by the light having passed through an upper half of the lens and the light having passed through a lower half of the same.

As shown in FIG. 4A, the present embodiment employs a ring-shaped lens for an optical axis having a recess at a point through which the optical axis passes. In FIG. 4B, a lens 1-3 shows a cross-sectional profile of the lens, and a lens 1-3u shows a front view of the lens when viewed from the light source. Here, the outer diameter of the lens is presumed to be 3 mm. The entrance surface of the lens along the plane where the optical axis exists is formed from an aspheric surface of $x=0.5*(y-1.5)^{1.5}$ (unit: mm). Here, "x" denotes an optical axis, and a portion of the optical axis in the traveling direction of light is taken as being positive. Reference symbol "y" denotes a radial axis perpendicular to the optical axis. A light exit surface of the lens 1-3 is taken as a flat surface. The refraction factor of the lens material is taken as 1.51.

The light emitted from the laser light source 2 enters the optical lens 1-3 by way of the collimator lens 1c. The light having passed through an upper portion of the lens above the optical axis is radiated on the object 10 via a light beam locus 2-3-1. Similarly, the light having passed through a lower portion of the lens below the optical axis is radiated on the object 10 via a light beam locus 2-3-2. The light beams having reached the identical point (the point of interference) 5 on the object 10 are emitted from the single light source and hence cause interference. As mentioned above, the laser beam emitted from a single light source is projected on the object within the plane where the optical axis exists as if the light were virtually emitted from two light sources 2-1, 2-2. In the present embodiment, the light originating from a point-like source of light is collimated through use of a collimator lens, and the thus-collimated light is caused to enter the lens. The collimated light can be considered to be an infinite light source. This infinite light source is virtually taken as two point light sources by the above-described lenses.

Figure 5:
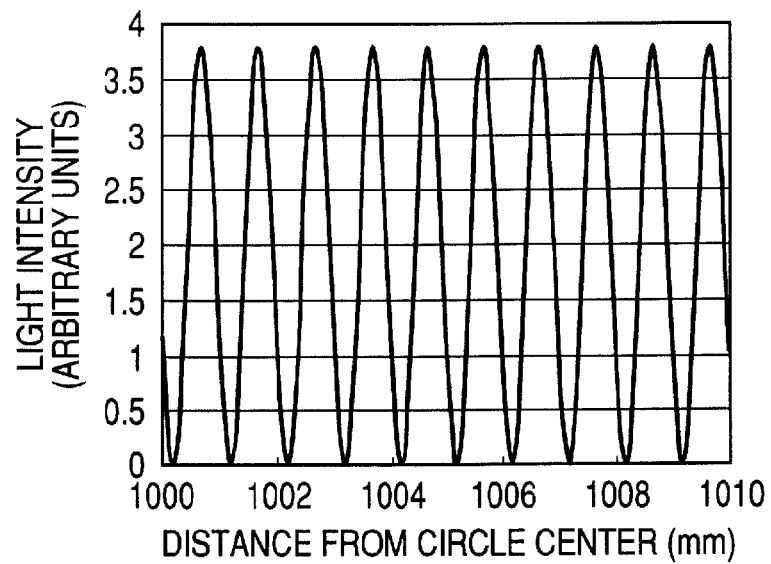
FIG. 5 is a view showing a portion of a concentric interference pattern obtained by simulation.

The nature of the interference pattern, which is formed by collimating the light originating from the semiconductor laser 2 with the collimator lens 1c and causing the thus-collimated light to enter the lens 1-3, is examined through simulation. The intensity of light originating from a semiconductor laser usually assumes a Gaussian distribution. Here, simulation is carried out on assumption that the intensity of the light having passed through a portion of the lens having an outer diameter of 3 mm is reduced to 3.4% the intensity of the light passing through the center of the lens (the optical axis). The result of simulation shows that a concentric interference pattern having a diameter of about 4 m is formed on an object located 4 m ahead. FIG. 5 shows a portion of the interference pattern. FIG. 5 shows a concentric interference pattern located at a position spaced 1000 mm to 1010 mm away from the center of the circle. According to this graph, concentric circles can be ascertained to be formed precisely at a pitch of 1.0 mm.

Second Embodiment

Figure 6A:
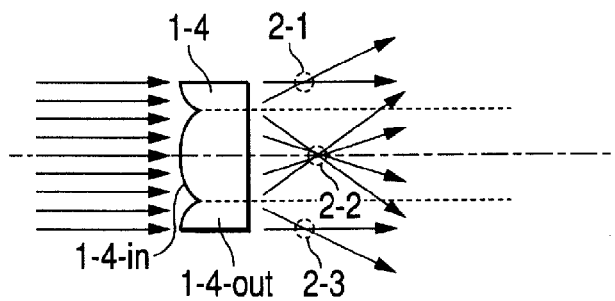
FIGS. 6A and 6B are views showing an embodiment of an optical lens system where light beams having passed through an upper or lower half of the lens cause interference, to thus form a concentric interference pattern.
Figure 6B:
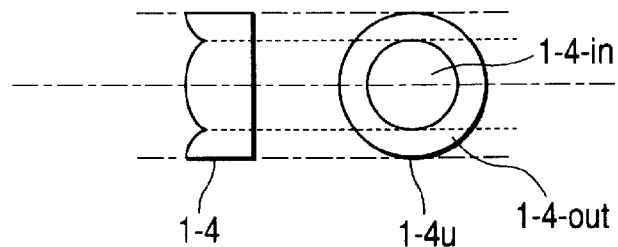

FIGS. 6A and 6B are views showing an embodiment of the optical lens system where light beams having passed through an upper half of the lens or light beams having passed through a lower half of the same cause interference to thus form a concentric interference pattern.

As shown in FIG. 6A, the embodiment uses a lens 1-4-in located in the vicinity of the optical axis and an outer lens 1-4-out surrounding the outside of the lens 1-4-in. In FIG. 6B, the lens 1-4 shows a cross-sectional profile of the lens, and a lens 1-4u shows a front view of the lens when viewed from the light source. The light entrance surface of the inner lens assumes a cross-sectional profile of a curve surface of the second order (a parabolic curve) surface $x=0.6*y*y$ (unit: mm). Here, "x" denotes an optical axis, and a portion of the optical axis in the traveling direction of light is taken as being positive. Reference symbol "y" denotes a direction perpendicular to the optical axis. The lens diameter of the inner lens 1-4-in is taken as 2.0 mm. The light entrance surface of an outer lens 1-4-out is set to a curve surface of n-th order $x=1.4*(y-3)^{1.52}$ (a symbol ^ represents an exponent). The diameter of the outer lens is set to 3 mm. This equation shows that an aspherical surface of the outer lens assumes a curve of the n-th order centered on y=3 within an x-y plane. This unit that the light passing through the outermost rim portion of the lens travels straight through the lens without undergoing refraction. The refraction factor of the lens is set to 1.51. Even in the lens of this case, the virtual light source 2-2 can be considered to be situated in the optical path of the inner lens 1-4-in, and the virtual light sources 2-1, 2-3 can be considered to be situated in the optical path of the outer lens 1-4-out.

The intensity distribution of the light projected three meters ahead was examined through simulation by use of this lens. In this lens, the light having passed through the inner lens and the light having passed through the outer lens cause interference, and hence the light beams projected on the object via the respective lenses are desired to be substantially equal to each other. The light is made weaker or stronger by interference. However, if light beams having the same light intensity are generated alternately, a dark point where a light intensity of 0 is gained as a result of total cancellation of the light beams, and a bright point where a double light intensity is gained as a result of full intensification of the light beams, which in turn yields a characteristic of contrast of light intensity becoming clear.

Figure 7:
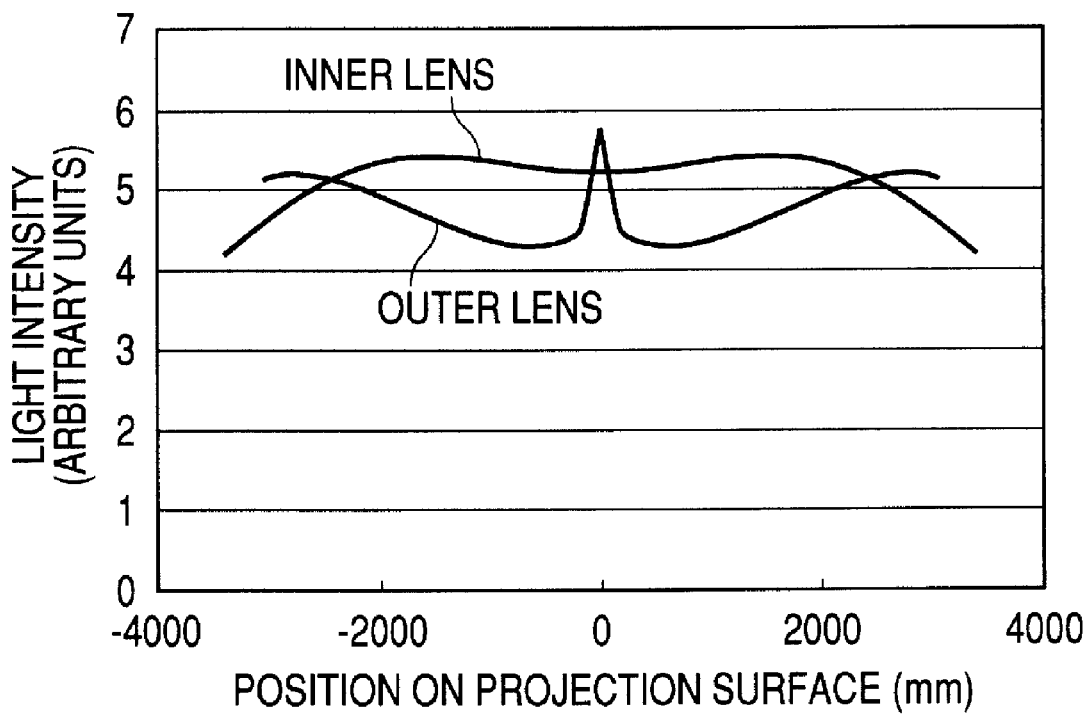
FIG. 7 is a graph showing the intensity of the light having passed through an inner lens achieved on a projection surface, and the intensity of the light having passed through an outer lens achieved on the projection surface.

FIG. 7 is a graph showing intensity of the light having passed through the inner lens to the projection surface and the intensity of the light having passed through the outer lens to the projection surface. In the drawing, the vertical axis represents light intensity, and the horizontal axis represents the position of light in the direction of a "y" axis (on the projection surface) (mm). From this graph, the light is understood to spread 3 m or more. The light having passed through the inner lens and the light having passed through the outer lens are ascertained to have substantially the same light intensity from 4 to 6. A sufficient bright/dark contrast is found to be gained by optical interference.

Third Embodiment

An embodiment of the optical lens system forming a concentric interference pattern will be provided hereunder.

Figure 8:
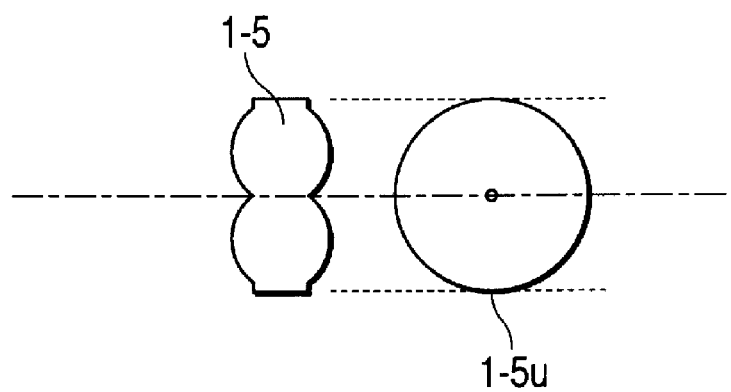
FIG. 8 is a view showing an example of a lens 1-5 whose light entrance surface and light exit surface have a convex curvature.

FIG. 8 is a view showing an example of a lens 1-5 whose light entrance and exit surfaces each have a convex curvature. The concentric interference pattern is formed as a result of the light having passed through the upper half of the lens and the light having passed through the lower half of the lens causing interference. The light exit surface of this lens has a large curvature, as well. Hence, a spreading angle of light becomes larger, which in turn yields an advantage of the ability to form large concentric circles.

Figure 9:
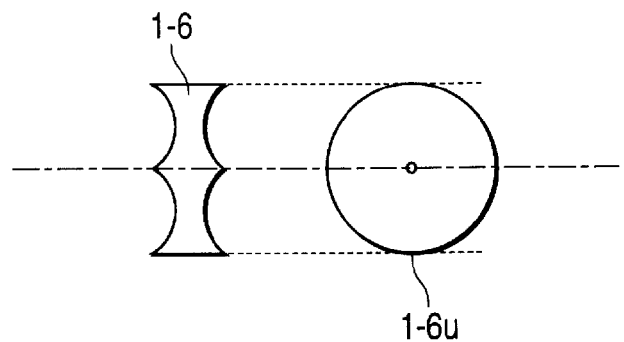
FIG. 9 is a view showing an example of a lens 1-6 whose light entrance surface and light exit surface have a concave curvature.

FIG. 9 is a view showing an example of a lens 1-6 whose light entrance and exit surfaces each have a concave curvature. The concentric interference pattern is formed as a result of the light having passed through the upper half of the lens and the light having passed through the lower half of the lens causing interference. The light exit surface of this lens has a curvature, as well. Hence, a spreading angle of light becomes larger, which in turn yields an advantage of the ability to form large concentric circles.

Figure 10:
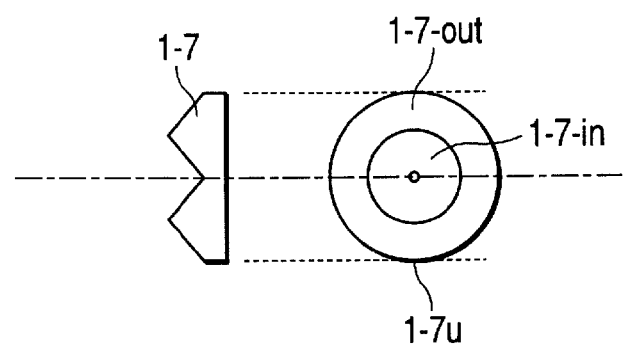
FIG. 10 is a view showing a lens 1-7 having two triangular cross-sectional profiles when the cross section of the lens is taken along a plane perpendicular to a plane through which an optical axis passes.

FIG. 10 is a view showing an example of a lens 1-7 having a cross-sectional profile including two triangles. Here, the light entrance surface of the lens has a triangular shape, and the light exit surface of the same is formed from a flat surface. Conversely, the light entrance surface may be formed from a flat surface, and the light exit surface may be formed from a triangular shape. In this lens, the light having passed through an inner lens 1-7-in and the light having passed through an outer lens 1-7-out cause interference, which in turn results in formation of concentric interference patterns.

Figure 11:
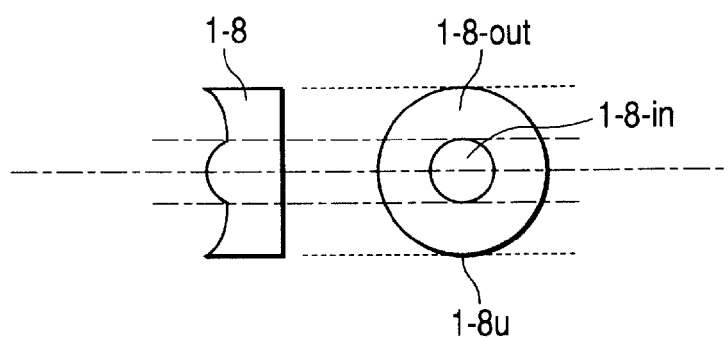
FIG. 11 is a view showing an example of a lens having a convex inner lens 1-8-in in the vicinity of the optical axis and a concave outer lens 1-8-out located outside the inner lens.

FIG. 11 is a view showing an example of a lens having a convex inner lens 1-8-in located in the vicinity of the optical axis and a convex outer lens 1-8-out located outside the inner lens. A portion of the outer lens 1-8-out contacting the inner lens 1-8-in has a curvature surface which permits straight travel of light without refraction. In this lens, the light having passed through the inner lens 1-8-in and that passing through the outer lens 1-8-out cause interference, to thus form concentric interference patterns.

Figure 12:
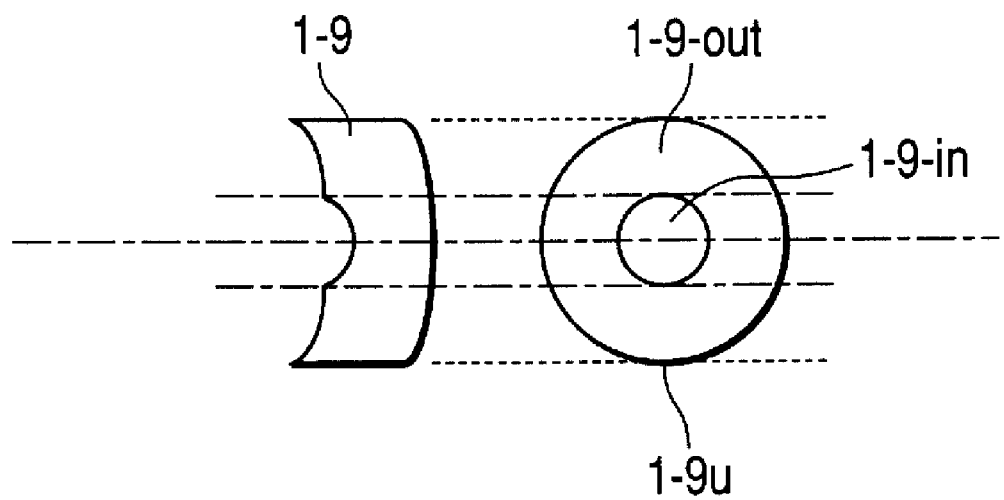
FIG. 12 is a view showing an example of a lens having a concave inner lens 1-9-in in the vicinity of the optical axis and a concave outer lens 1-9-out located outside the inner lens.

FIG. 12 is a view showing an example of a lens having a concave inner lens 1-9-in, and a concave outer lens 1-9-out located outside the inner lens. In this lens, the light having passed through the inner lens 1-9-in and that having passed through the outer lens 1-9-out cause interference, to thus form concentric interference patterns. In this lens, the cross-sectional profile of the light-exit-side of the lens is rendered spherical. As a result, there is yielded an advantage of pitches between concentric interference patterns being changed.

Figure 13:
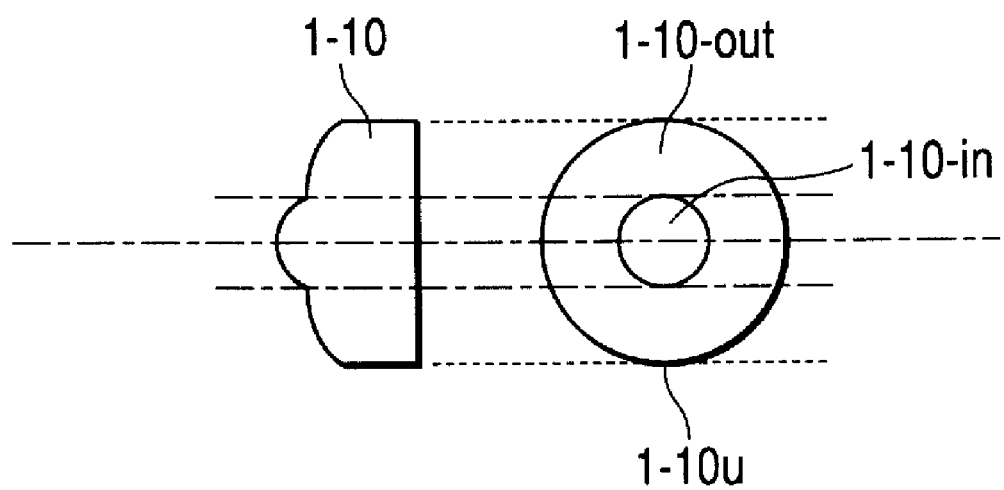
FIG. 13 is a view showing an example of a lens having an inner lens 1-10-in whose focal length is located in the vicinity of the optical axis and an outer lens 1-10-out located outside the inner lens.

FIG. 13 is a view showing an example of a lens having an inner lens 1-10-in whose focal distance is located in the vicinity of the optical axis, and an outer lens 1-10-out located outside the inner lens. The inner lens 1-10-in is formed from a spherical surface having a focal distance, and the outer lens 1-10-out is also formed from a spherical surface having a focal distance. Concentric interference patterns can be formed even when such a lens is used.

Figure 14:
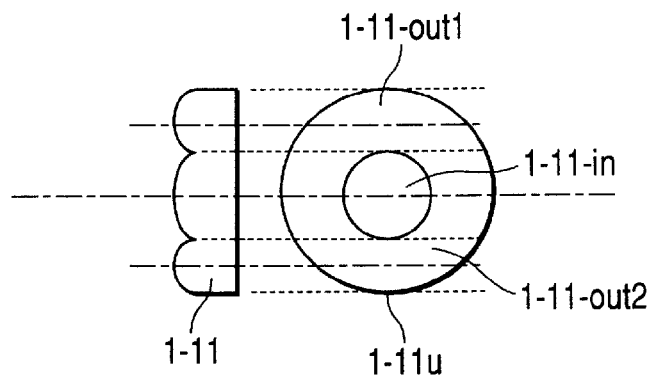
FIG. 14 is a view showing a lens where light beams having passed through three optical paths of the lens cause interference on an object to thus form a concentric pattern.

FIG. 14 is a view showing an example of a lens where the light having passed through the optical path of the lens 3 causes interference on an object to thus form concentric patterns. The light having passed through an inner lens 1-11-in located in the vicinity of the optical axis, the light having passed through an outer lens 1-11-out1 situated in an upper cross-sectional portion of an outer lens, and an outer lens 1-11-out2 situated in a lower cross-sectional portion of the outer lens cause interference on the object. In this case, the light beams which would cause interference reach the object in three directions. However, the inner and outer lenses are located at positions symmetrical about the optical axis. Hence, the interference patterns show a concentric shape. However, the intensity of the interference patterns is expressed by an equation determined by adding a third optical path L3 to Equation (1). The intensity assumes a function having complicated differences in intensity rather than assuming a simple cyclic function expressed by Equation (1).

Figure 15:
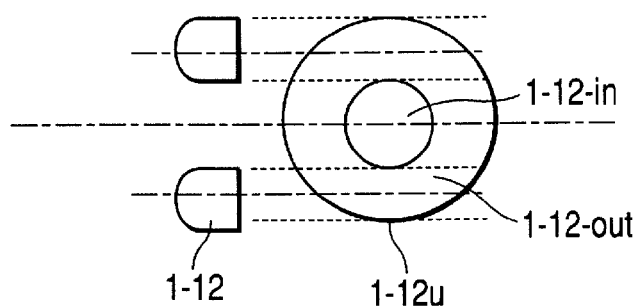
FIG. 15 is a view showing an example of a lens having a cavity in the vicinity of the optical axis and a lens member at only a rim of the lens.

FIG. 15 is a view showing an example of a lens having a cavity and no lens member in the vicinity of the optical axis and having a lens member only at a rim portion of the lens. Even when the lens is given such a structure, the light having passed through an upper portion of the lens above the optical axis and a lower portion of the lens below the optical axis form concentric interference patterns on the object.

Figure 16:
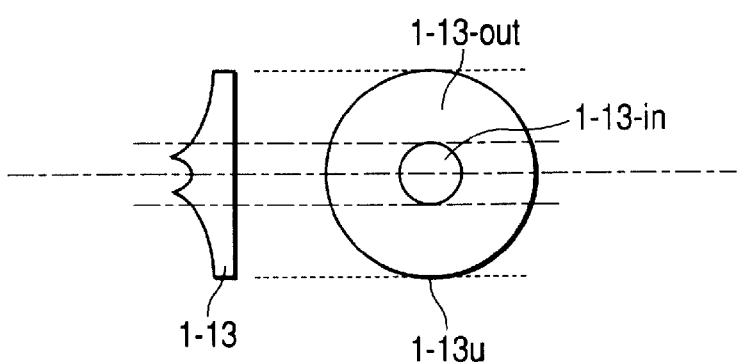
FIG. 16 is a view showing an example of a lens having a concave inner lens 1-13-in and a concave outer lens 1-13-out.

FIG. 16 is a view showing an example of a lens having a concave inner lens 1-13-in and a concave outer lens 1-13-out. The light having passed through an inner lens 1-13-in and the light having passed through an outer lens 1-13-out cause interference on the object to thus form concentric interference patterns.

In the foregoing embodiment, all of the lenses assume a shape symmetrical about the optical axis. However, even in the case of a polygonal shape, e.g., a regular polygonal cone having 16 angles, the same effect can be yielded.

Moreover, only one lens is utilized in the foregoing embodiments. However, needless to say, the lens shown in, e.g., FIG. 13, can be embodied by combination of a lens having the same diameter as the inner lens 1-10-in, in place of the inner lens 1-10-in, with one lens such as the outer lens 1-10-out.

Fourth Embodiment

Figure 17:
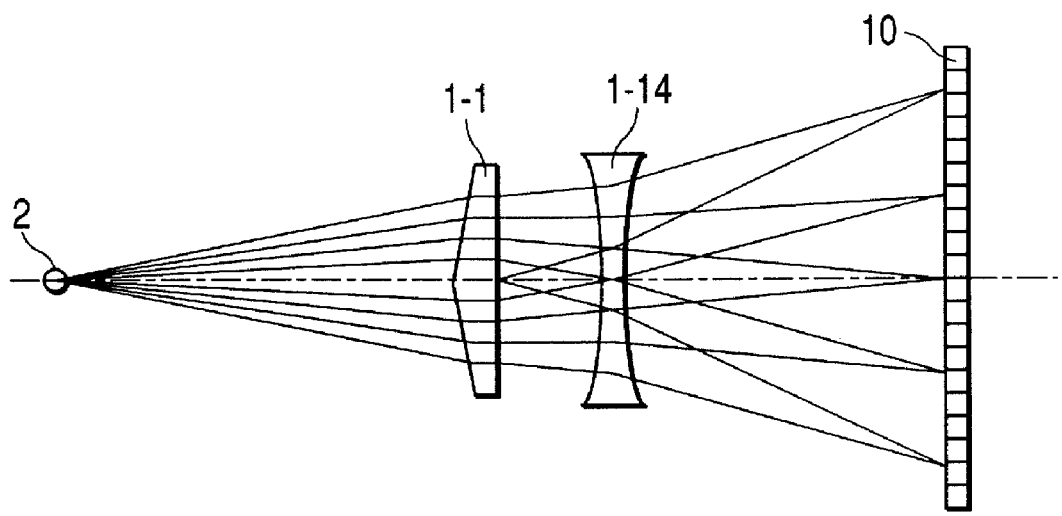
FIG. 17 is a view showing an embodiment where a concentric interference pattern is formed by combination of two lenses.

FIG. 17 is a view showing an embodiment where concentric interference patterns are formed by combination of two lenses. In the embodiment, concentric interference patterns are formed by an optical lens system formed by combination of the conical lens 1-1 utilized in the first embodiment and a biconcave lens 1-14. In this case, the biconcave lens 1-14 serves as projecting the light emitted from the conical lens 1-1 in an enlarged manner. As mentioned above, the concentric interference patterns can be formed by various combinations described in connection with the first through third embodiments. The present embodiment yields an advantage of the ability to project the concentric interference patterns at a wide angle.

Figure 18:
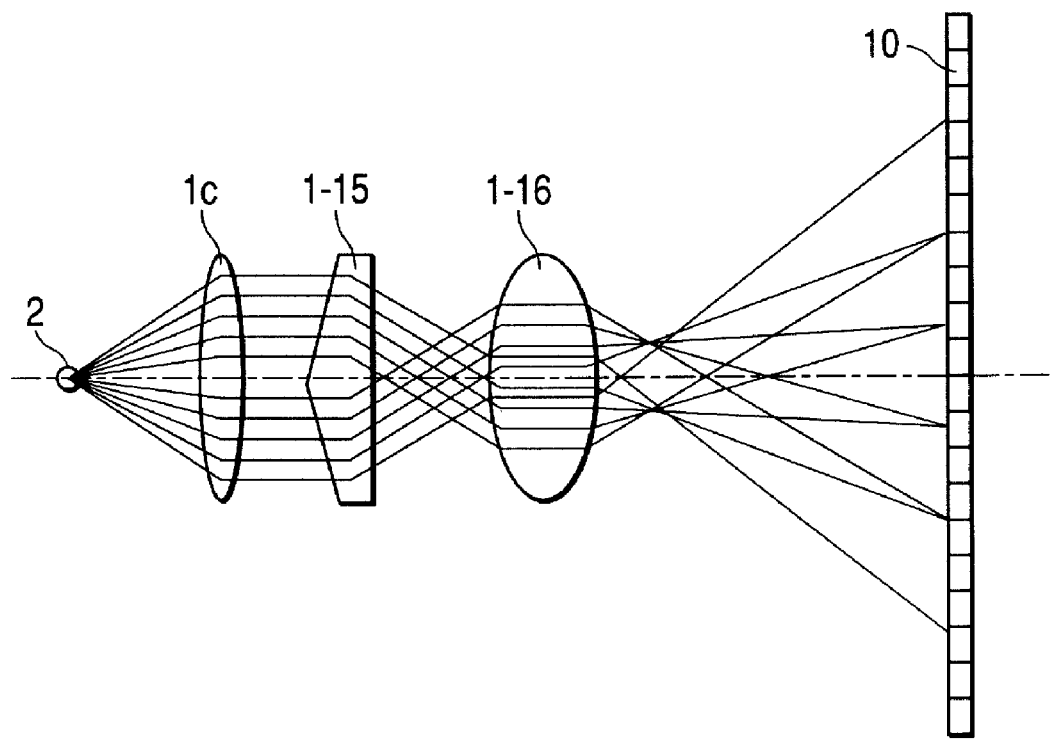
FIG. 18 is a view showing an embodiment where a concentric interference pattern is formed by combination of three lenses.

FIG. 18 is a view showing an embodiment where concentric interference patterns are formed by combination of three lenses. As illustrated, the optical lens system of the present embodiment collimates the light emitted from the laser light source 2 parallel through use of the collimator lens 1c. Subsequently, the traveling direction of light is changed by placing a conical lens 1-15 at a position subsequent to the collimator lens 1c. There is disposed a lens 1-16 for superimposing light such that concentric interference patterns are drawn on the object. Here, the conical lens plays the role of changing the traveling direction of the collimated light and furcating the optical path as if two light sources were provided on the plane perpendicular to the plane through which the optical axis passes. The lens disposed at a position subsequent to the conical lens acts as superimposing light on the object 10. As in the case of the first embodiment, the conical lens plays the role of superimposing light such that the concentric interference patterns are formed on the object. However, even in the present invention, the concentric interference patterns are formed as a result of interference having been caused by the light having passed through the upper half of the conical lens 1-15 and the light having passed through the lower half of the same. Specifically, the light beams having passed through the entire lens cause interference on the object 10 by the lens 1-16 serving as superimposing light.

Fifth Embodiment

Figure 19:
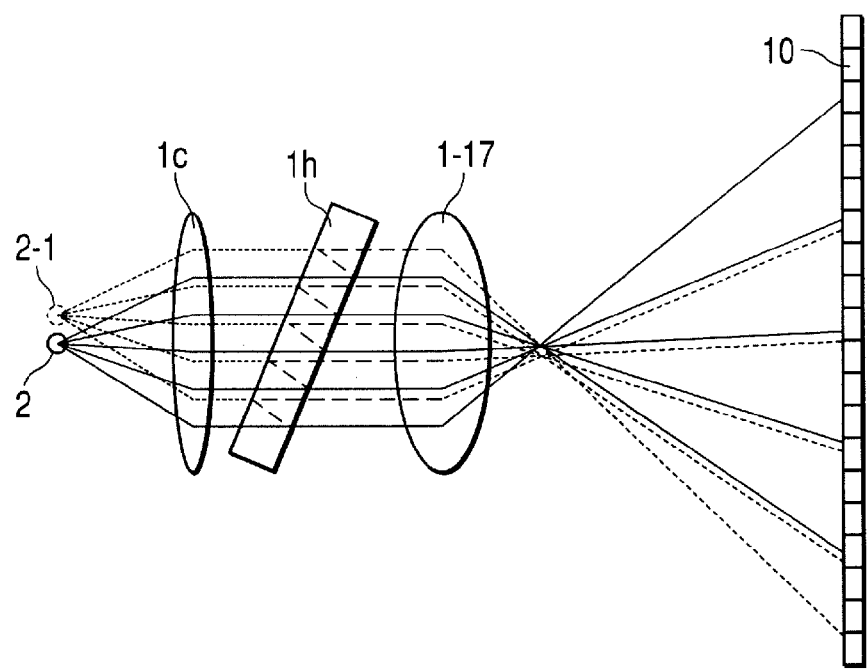
FIG. 19 is a view showing an embodiment where a concentric interference pattern is formed by combination of a lens with another optical component.

FIG. 19 is a view showing an embodiment where concentric interference patterns are formed by combination of a lens with another optical component. In the embodiment, after having been furcated by a half mirror, the light emitted from the laser light source is projected on the object, to thus form concentric interference patterns. As illustrated in FIG. 18, the light emitted from the laser light source 2 is collimated by the collimator lens 1c. Next, a glass plate 1h having a half mirror surface on both sides thereof is placed in the optical path, wherein the half mirror surface permits passage of half of light and reflects the remaining half of light. As shown in FIG. 19, the light reflected from the light exit surface of the glass plate 1h again undergoes reflection on the light entrance side of the glass plate 1h, to thus enter the next lens 1-17. Specifically, the light having traveled without undergoing reflection on the glass plate 1h and the light having undergone reflection on the glass plate 1h twice enter the convex lens 1-17, where the light beams overlap each other to thus form concentric interference patterns.

In this case, the virtual light source 2-1 can be considered to exist because of presence of the glass plate 1h. Namely, the laser beams emitted from the light sources 2, 2-1 can be considered to enter the convex lens 1-17, to thus form concentric interference patterns. Strictly speaking, the interference patterns are not perfect circles. Since the light source 2 or 2-1 does not exist on the optical axis of the optical lens 1-16, the interference patterns are not perfect circles in a strict sense. However, when the light sources 2 and 2-1 are situated not apart from each other, the interference patterns virtually form circles.

As in the case of the present embodiment, a unit to furcate the laser beam is introduced to form concentric circles, which in turn obviates a necessity for a lens having a special shape for forming concentric circles. Concentric interference patterns can be formed through use of an ordinary convex lens 1-17. In other words, designing of a lens becomes easy.

In the present embodiment, the glass plate 1h serving as a half mirror is placed in the optical path in an inclined manner. However, even when the glass plate 1h may be placed perpendicular to the optical axis by removing the collimator lens 1c, concentric interference patterns can be formed. In this case, the interference patterns assume a perfect circular shape. The virtual light source 2-1 is present in the optical axis and situated at a position more distant from the lens than from an actual light source 2.

In the present embodiment, the laser beam is furcated by utilization of the plate glass having a half mirror surface on both sides thereof. Light is furcated by another light furcation unit, e.g., a light furcation unit such as a triangular prism or a half mirror. Needless to say, the concentric interference patterns can be formed by superimposing the thus-furcated laser beam on the original laser beam.

Sixth Embodiment

A positional measurement system using the optical lens system of the present invention will now be described.

Figure 20:
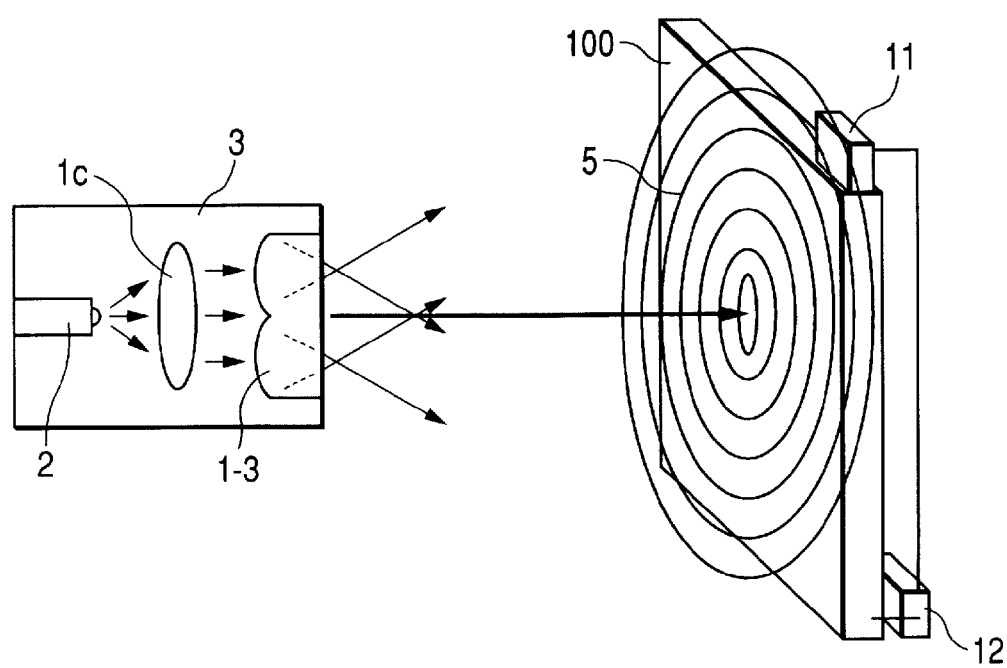
FIG. 20 is a view showing an embodiment of a positional measurement system which measures an indication point pointed by a light source module by using, as the light source module, a lens to be used for forming a concentric interference pattern and a semiconductor laser light source.

FIG. 20 is a view showing an embodiment of a positional measurement system where the lens to be used for forming concentric interference patterns and the semiconductor laser light source are used as a light source module and where a point pointed by the module is measured. The present embodiment includes the semiconductor laser 2, the light source module 3 having the collimator lens 1c and the ring-shaped lens 1-3 to be used for forming concentric interference patterns, a display device 100, a sensor (e.g., an image sensor) 11 for detecting concentric interference patterns, and the computing device 12 for computing data pertaining to the thus-detected interference patterns.

The light source module 3 includes the semiconductor laser 2 having a wavelength of 850 nm and the ring-shaped lens 1-3 to be used for forming concentric interference patterns. The outer diameter of the lens is set to 3 mm. The light entrance surface of the lens within the plane through which the optical axis passes is formed from an aspheric surface of $x=0.5*(y-1.5)*\sqrt{(y-1.5)}$ (a unit is mm). Here, "x" denotes an optical axis, and a portion of the optical axis in the traveling direction of light is taken as being positive. Reference symbol "y" denotes a radial axis perpendicular to the optical axis. The light exit surface of the lens 1-3 is taken as a flat surface. The refraction factor of the lens material is taken as 1.51. The light emitted from the semiconductor laser 2 is caused to enter the lens 1-3 after having bee collimated by the collimator lens 1c.

Figure 21:
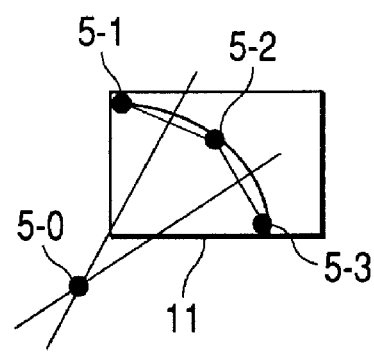
FIG. 21 is a view for describing a method for determining the center of a circle from a circular arc.

When the light source module is utilized as a pointer or the like, the center point of the concentric interference patterns existing in an extension of the optical axis of the lens 1-3 is taken as a pointed point. The sensor 11 is disposed at the corner of the display device 100, to thus detect portions of the concentric interference patterns 5. The sensor 11 is provided with an infrared-radiation filer which permits passage of only the light having a wavelength longer than 850 nm. As a result, light such as an interior lamp, which would become noise, is interrupted. Plural circular arcs which are portions of the concentric circular patterns are projected on the sensor 11. The computing device 12 processes an image of the circular arcs, to thus compute the center of the concentric circles. FIG. 21 shows a method for determining the center of concentric circles from the circular arcs. Arbitrary three points 5-1, 5-2, and 5-3 are selected on the circular arcs, thereby determining two line segments. By a mathematical theorem, the point of intersection of vertical bisectors of the respective line segments is determined as the center of a circle, that is, 5-0. The center of this circle is detected as the point pointed by the light source module 3. Arbitrary three points on the circular arcs can be extracted from all of circular arc data sets detected by the sensor. Hence, as the number of extracted points increases, noise components are cancelled, to thus enable determination of a point of center with high positional accuracy.

As mentioned previously, the sensor 11 is attached to the display 100, to thus detect concentric interference patterns. Moreover, the computing device 12 computes the position indicated by the light source module 3. A signal for moving the cursor to this position is transmitted from the computing device 12 to the display device 100, whereby the light source module 3 can be utilized as a pointer device.

Although only one sensor is utilized in the previous embodiment, plural sensors can be provided. In this case, even when the outer diameters of concentric circles are small, the sensors come to be able to detect the concentric circles.

Seventh Embodiment

Figure 22:
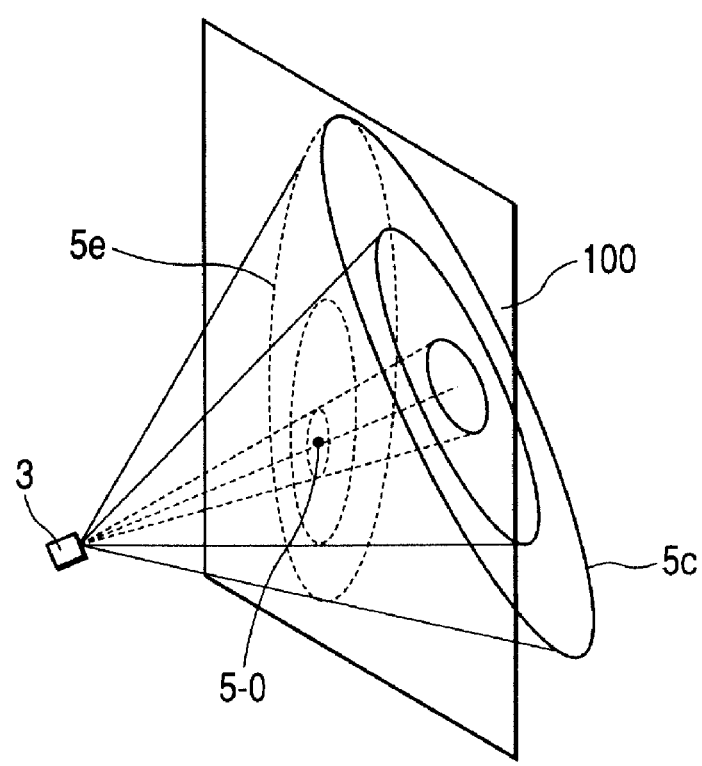
FIG. 22 is a view for describing a case where a direction in which a light source module 3 points is inclined with respect to a display device 100 in a seventh embodiment.

FIG. 22 is a view for describing a case where the direction pointed by the light source module 3 is inclined with respect to the display device 100, in connection with a sixth embodiment. As shown in FIG. 22, when the display device 100 is perpendicular to the optical axis of the light source module 3, projected interference patterns come to concentric circles 5c. In contrast, when the display device 100 is inclined with respect to the optical axis, multiple ovals 5e are projected. According to the mathematical theorem, the multiple ovals 5e converge on a focal position 5-0 of the ovals. Specifically, of the two focal positions existing in the ovals, ovals spread in a multiple manner while taking the focal point 5-0 close to the light source module as the center, to thus form the multiple ovals 5e. The oval that takes the X axis as the major axis and the Y axis as the minor axis can be expressed by the following expression.

$$\frac{X^2}{a^2} + \frac{Y^2}{b^2} = 1 \quad (3)$$

A coordinate system which takes the oval as a reference is converted into a fixed coordinate system x-y of a projected plane. Since these two coordinate systems are present within a single plane, the coordinate systems can be associated with each other by subjecting parallel movement (p, q) and rotation θ to coordinate conversion.

$X = x \cos θ + y \sin θ − p$ $Y = −x \sin θ + y \cos θ − q$ \quad (4)

A relational expression (4) is substituted into a relational expression (3), whereby the following expression is obtained.

$$\frac{(x\cos θ + y\sin θ − p)^2}{a^2} + \frac{(−x\sin θ + y\cos θ − q)^2}{b^2} = 1 \quad (5)$$

The sensor 11 provided in the display device 100 reads five points from coordinates (x, y) of one oval, and the thus-read coordinates are substituted into Equation (5). Since unknown numerals are five, that is, "a," "b," "p," "q," and "θ," unknown numerals can be determined by reading coordinates of five points. When the oval expression is determined, the position of a focal point can be computed readily. Since two focal points are present, a determination must be made which one of the two focal points is the convergent point 5-0. The convergent point 5-0 is closer to the light source module 3, and hence the direction, in which the light source is present, can be determined from illumination information detected by the sensor.

Alternatively, since the plural ovals 5e are projected on the sensor 11, a convergent point of the multiple ovals can be computed by deriving different oval equations. Specifically, of the two focal positions of the plural oval equations, the convergent point 5-0 shows a single point. However, the other focal points show different positions. By virtue of this phenomenon, convergent points of the multiple ovals can be determined.

Eighth Embodiment

Figure 23:
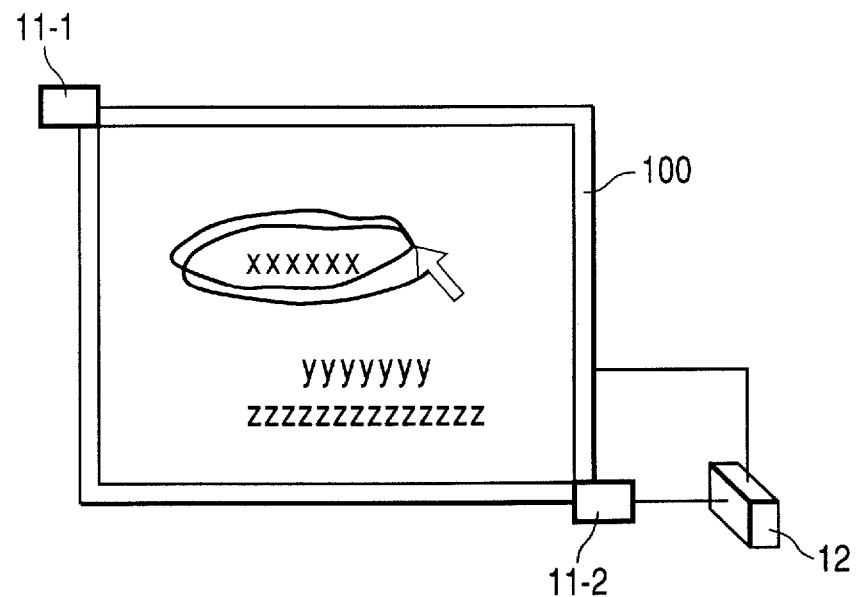
FIG. 23 is a view showing an embodiment where sensors are disposed at diagonal positions of the display device and a cursor is moved to a point at which a pointer points, by automatically detecting the size of the display device.

FIG. 23 shows an embodiment where sensors are provided at respective diagonal positions of the display device to automatically detect the size of the display device and where the cursor is moved to a point pointed by the pointer. As shown in FIG. 23, in the present embodiment, sensors 11-1, 11-2 are provided at diagonal corner positions on the screen. The display device 100 has a rectangular shape, and the longitudinal-and-lateral sizes of the display device can be specified by the sensor 11-1 disposed at the upper left corner and the sensor 11-2 disposed at the lower right corner. Specifically, the screen of the display section of the display device can be readily specified by arrangement of the sensors 11-1 and 11-2.

When the display device 100 is connected to a computer, the cursor can be moved to a point pointed by the pointer, through use of a light source module as a pointer. Further, as a result of switches corresponding to left and right click buttons of the mouse being provided on the pointer, manual drawing of data on the screen through handwritten input operation. Moreover, the computer screen can be freely operated as in the case of a mouse.

Figure 24:
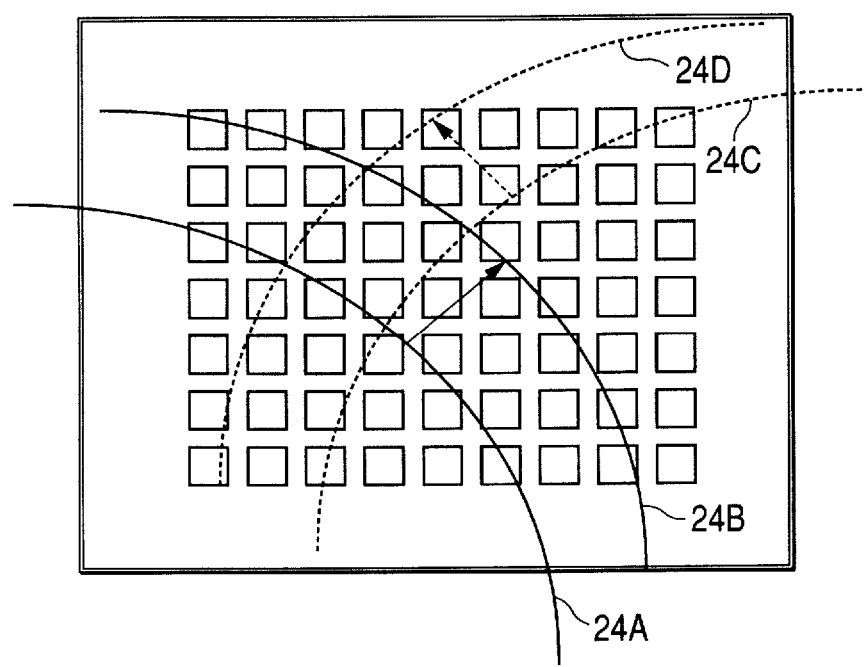
FIG. 24 is a view showing a method for tracing a circular arc.

When plural light source modules are utilized as pointers, plural circular arcs can be distinguished from each other by tracing the circular arcs of the same concentric circle. Thus, positional information about the respective circular arcs can be measured. As shown in FIG. 24, the fact that the shape of the circular arc consecutively changes from 24A to 24B or 24C to 24D can be utilized as a method for tracing circular arcs. Further, there is also utilized a fact that the position of the light source modules consecutively changes as a result of the center of the concentric circle corresponding to the center of the circular arcs changing consecutively. Specifically, the light source module does not suddenly move to another position, and the position of the light source module changes consecutively in normal times. Hence, the circular arcs can be distinguished from other circular arcs.

The ordinary sensor has pixels for detecting three colors RGB. Therefore, the three light source modules can be readily distinguished from each other by use of the laser light source of three colors R, G, and B.

Figure 25:
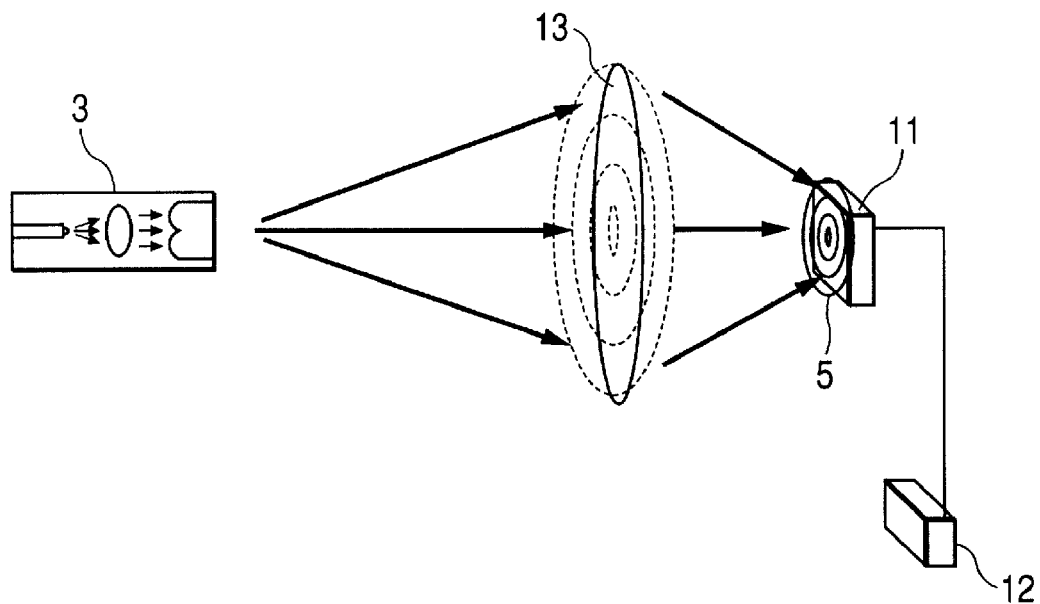
FIG. 25 is a view showing a method for enabling the sensor to capture an image by scaling down the interference pattern through use of a lens 13 which is larger than the sensor 11.
Figure 26:
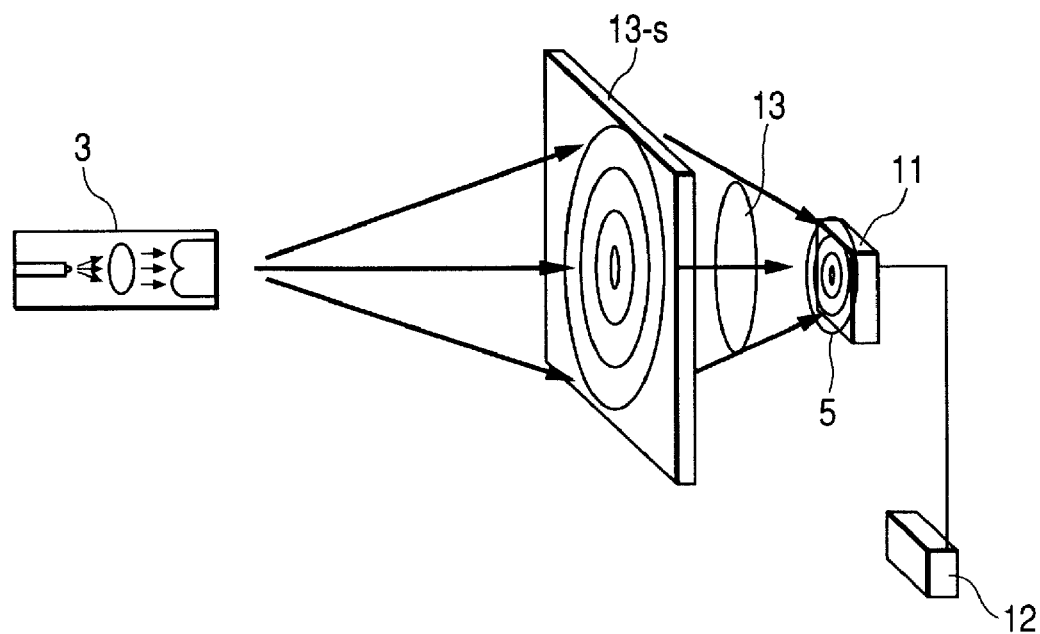
FIG. 26 is a view showing a method for causing the sensor 11 to converge the scattered light into an image through use of an imaging lens 13 by projecting an interference pattern on a scattering plate 13-s which is larger than the sensor 11.

When the concentric interference pattern has a large diameter, a sensor such as a detector encounters difficulty in detecting a curvature radius of a circle with high accuracy. In that case, as shown in FIG. 25, another effect method is to enable the sensor to acquire an image by scaling down the interference patterns through use of the lens 13 larger than the sensor 11. As shown in FIG. 26, another effective method is to project interference patterns on the scattering plate 13-s which is larger than the sensor 11 and to converge the scattered light into an image on the sensor 11 through use of the imaging lens 13.

Ninth Embodiment

Figure 27:
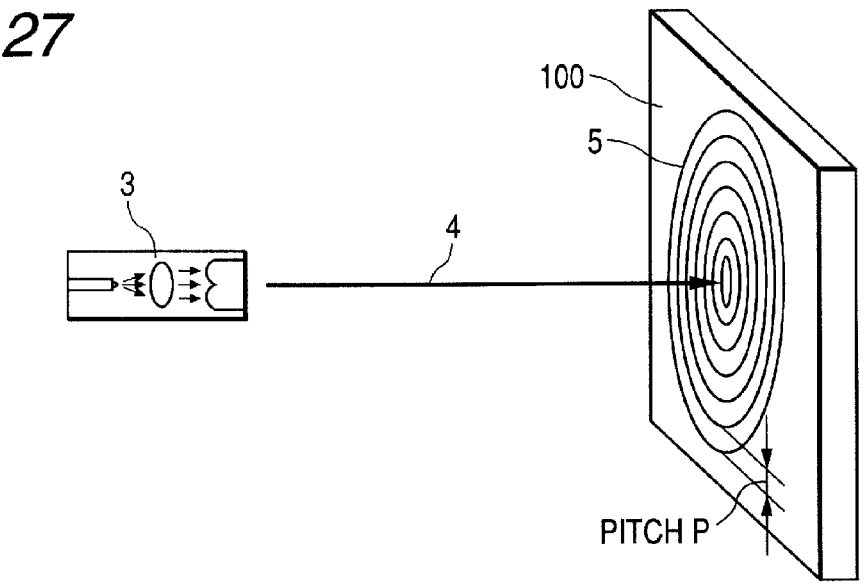
FIG. 27 is a view showing an embodiment for measuring a three-dimensional position of a light source module from interference patterns projected on a plane at uniform pitches.

FIG. 27 is a view showing an embodiment where a three-dimensional position of the light source module is measured on the basis of the interference patterns projected on a plane at equal pitches.

First, the light source module is equipped with an optical lens having a ring convex front surface and a concave rear surface. The ring convex front surface is embodied as an aspheric lens having a cross-sectional profile expressed by $x=0.3*(y-1.5)^{1.55}$, where "x" designates an optical axis and "y" designates a radial axis of the lens perpendicular to the optical axis. The rear concave lens is embodied as a spherical lens having a curvature radius of 62 mm. The lens has a diameter of Φ6 mm, a thickness of 3 mm, and a refraction factor of 1.51.

Figure 28A:
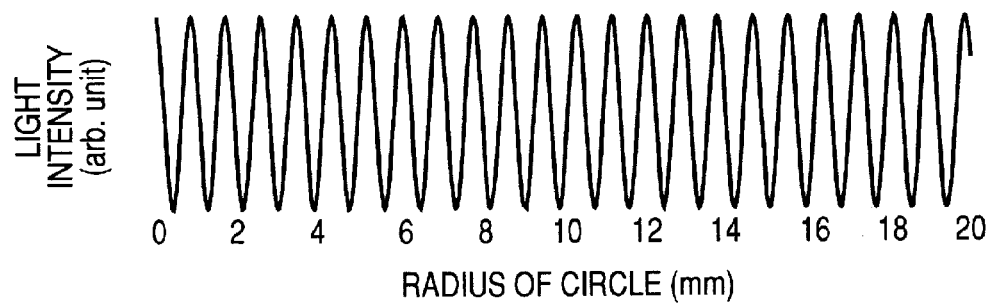
FIGS. 28A and 28B are views showing the result of simulation where pitches of the interference patterns become substantially identical with each other at all locations on condition that the optical axis of the light source is perpendicular to the plane.
Figure 28B:
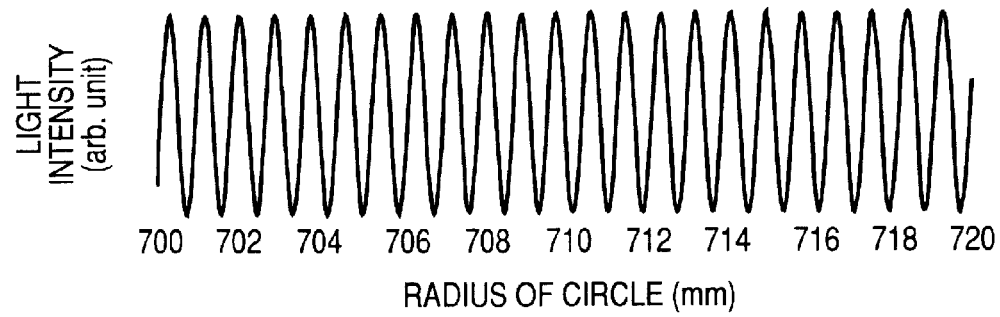

The wavelength of the laser light source is set to 850 nm. After having been collimated into parallel light, the laser beam is caused to enter the ring convex front surface/the concave rear surface of the lens. The simulation result shows that all of the pitches of the concentric circular patterns projected on the projection plane assume a value of 0.85 to 0.86 mm from the center to the rim of the patterns when the distance from the rear surface of the lens to the projection plane is set to 3000 mm. The simulation result is shown in FIGS. 28A, 28B. Specifically, if the optical axis of the light source is perpendicular to the plane, pitches of the interference patterns are found to be substantially equal (concentric circles of equal pitches are found to be acquired) at any positions within the plane. Accordingly, the center of the concentric circles can be computed from the curvature of the concentric circles detected by the sensors. Next, the distance from the light source module to the optical axis can be ascertained to be computed from the pitches of the concentric circles.

When the plane is inclined with reference to the optical axis 4 of the light source module, the angle of inclination of the plane can be computed from a change in the pitches of the multiple ovals. If the angle of inclination of the plane is found, the distance to the light source module can be determined in the same manner as mentioned previously.

By application of the present measurement method, the actin of the person who provides a presentation by utilizing the light source module as a pointer and the location of a pointed point can be effectively measured. The sensors are disposed in the vicinity of a presentation display screen, and a location pointed by the pointer and the location of the pointer are continuously recorded. As a result of this, the location of the point on a presentation material as well as the action or motion of a presenter can be recorded simultaneously. Thus, the method of the present embodiment becomes a measurement method effective for summarizing or replaying the presentation.

Tenth Embodiment

Figure 29:
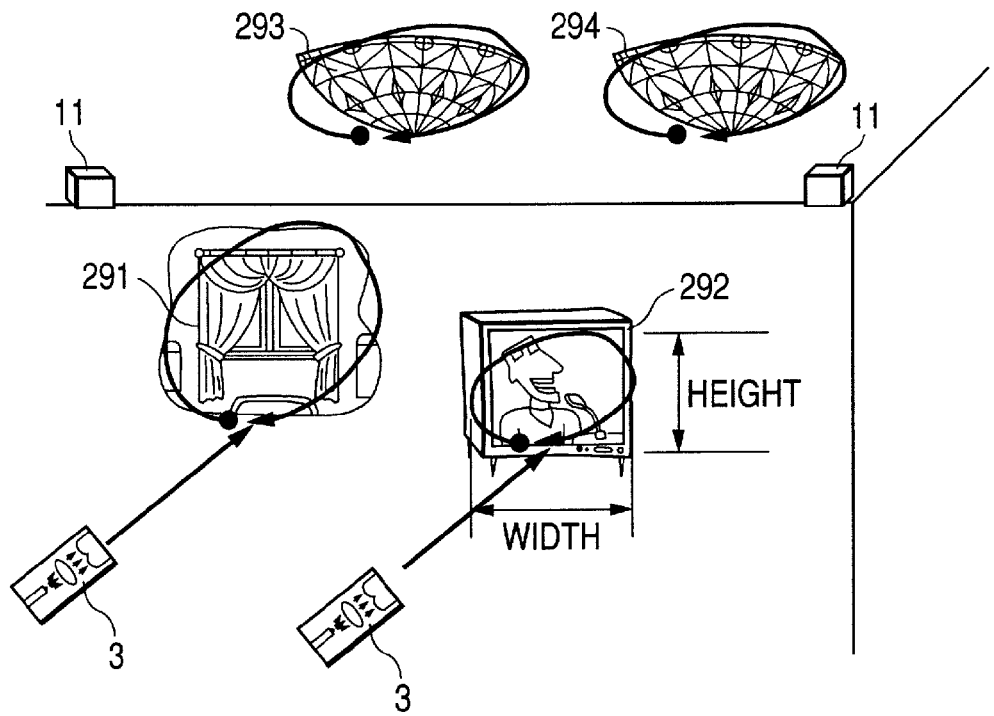
FIG. 29 is a view showing an embodiment for measuring the size of the object by utilizing the light source module as a pointer.

FIG. 29 is a view showing an embodiment where the light source module is utilized as a pointer to thus measure the size of an object. As shown in FIG. 29, in the embodiment, the sensor 11 serving as a device for detecting interference patterns are provided in numbers at corners of the ceiling of a room. A window 291 and a television set 292 are provided close to a wall in the room, and two pieces 293, 294 of lighting equipment are disposed on the ceiling. For instance, the window is enclosed by a circle such that the point pointed by the pointer becomes equal in size with the window 291. As a result of the vertical and horizontal position of the circle being made equal to the size of the window 291, the size of a square window and the location of the same can be measured readily. Similarly, the dimension and position of the television set 292 can be measured readily. Two pieces of similar lighting equipment are disposed on the ceiling. The positions and dimensions of the respective pieces of lighting equipment can also be measured readily by enclosing the pieces of lighting equipment through use of the pointer.

The position and size of the object are measured by enclosing the object with a circle in the above description. However, when the object is rectangular as in the case of the window, the size and position of the object can also be measured by pointing diagonal two points of the object. Moreover, the dimension of a television set or radio can also be measured readily by pointing two diagonal points.

Eleventh Embodiment

Figure 30:
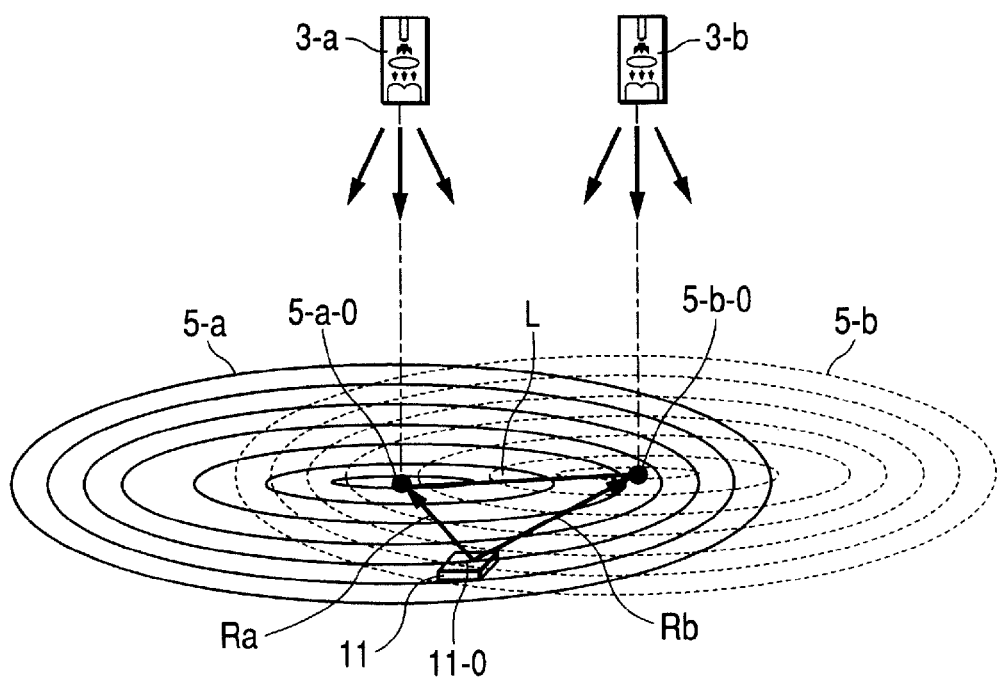
FIG. 30 is a view showing an embodiment of the positional measurement system which detects the direction and position of the sensor.

FIG. 30 is a view showing an embodiment of the positional measurement system which determines the direction and position of the sensor. As shown in FIG. 30, in the present embodiment, light source modules 30a, 30b are disposed on the ceiling while being spaced apart from each other by only a distance L, concentric interference patterns 5-a, 5-b are projected on the floor, whereby a center 5-a-0 of the interference patterns and a center 5-b-0 of the same are also projected while being spaced apart from each other by the distance L. The interference patterns are adjusted such that an overlap exist between approximately halves of the respective interference patterns, and the patterns are alternately projected by pulse illumination, thereby avoiding occurrence of complicated identification of the interference patterns, which would otherwise arise when the interference patterns overlap each other on the sensors. The center 5-a-0 of the concentric circle 5-a is taken as (0, 0) for the sake of convenience, and the center 5-b-0 of the concentric circle 5-b is set as (0, L) for the sake of convenience.

Figure 31:
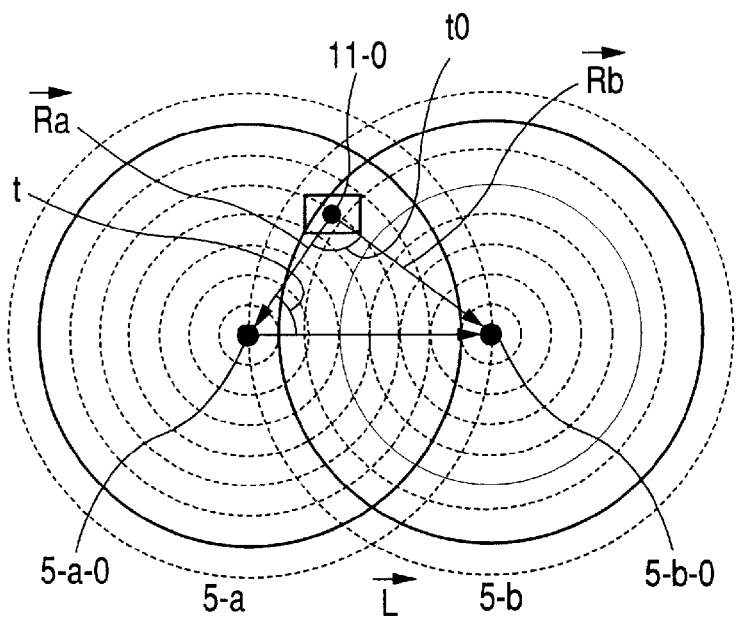
FIG. 31 is a view for describing a method for determining coordinates of the position of the sensor.

In FIG. 30, the center position of the sensor 11, such as an image sensor, is assumed to be 11-0, and the sensor detects the interference patterns 5-a, 5-b, thereby computing vectors Ra, Rb toward the centers 5-a-0, 5-b-0 of the concentric circles from the center 11-0 of the sensor. Lengths of the respective vectors are taken as Ra, Rb. Therefore, the sensor 11 is found to be present at any position along a radius Ra from the origin, and coordinates of the position of the sensor is expressed as (Ra, t) in the form of polar coordinate . Here, as shown in FIG. 31, the angle "t" corresponds to an angle made by the "x" axis (the vector L). If "t" is determined, positional coordinates of the sensor 11 will be determined.

$$Rb^2 = Ra^2 + L^2 - 2*Ra*L*\cos(t) \quad (6)$$

By this equation, cos (t) can be determined.

As shown in FIG. 31, when an error in the distances Ra, Rb are presumed to be large, it is better to utilize an angle t0 which can be measured clearly. Specifically, the accuracy of an indefinite value can be enhanced through use of $$L^2 = Ra^2 + Rb^2 - 2*Ra*Rb*\cos(to) \quad (7).$$

Subsequently, the angle "t" is determined, whereby the positional coordinates of the sensor can be determined.

Figure 32:
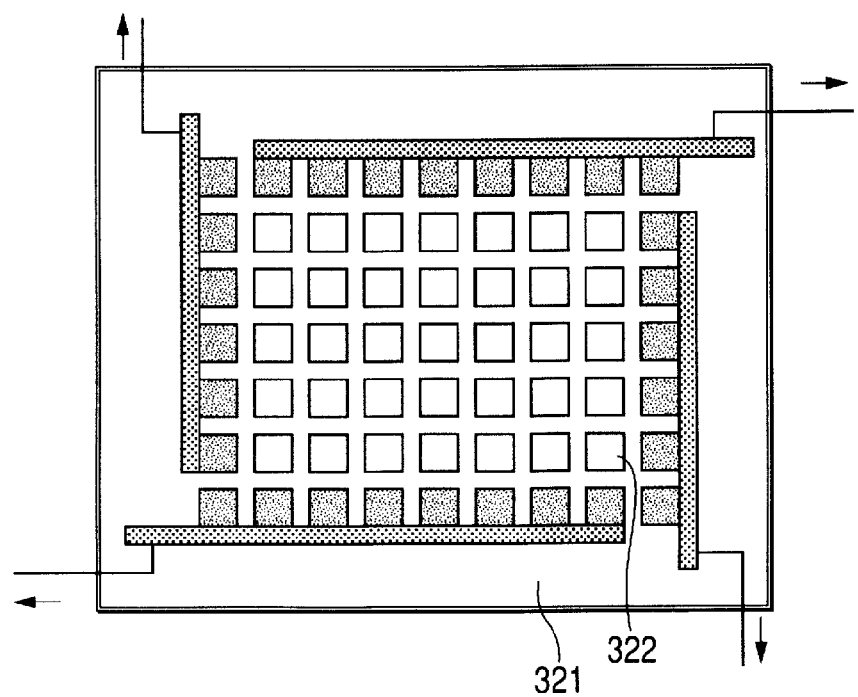
FIG. 32 is a view showing an example of the sensor equipped with a light-receiving element for detecting light at a speed faster than a frame speed required for photographing.

In the present embodiment, a method for providing a sensor for detecting concentric circular patterns with a light-receiving element capable of receiving an optical signal faster than an ordinary image capturing speed is adopted as a method for identifying the light source module. FIG. 32 is a view showing an example of a sensor equipped with a light-receiving element which detects light faster than an imaging frame speed. The sensor of the present embodiment is provided with a two-dimensionally-arranged light-receiving element array 321. An avalanche photodiode or the like can be utilized as a high-speed light-receiving element 322. In many cases, image data captured by an ordinary sensor are 30 frames per second. However, when a light source employing a semiconductor laser is used, pulses can be illuminated one million times per second. If the sensor can identify the pattern of the pulse illuminations, positional measurement can be performed by distinguishing plural light source modules from each other.

Twelfth Embodiment

Figure 33:
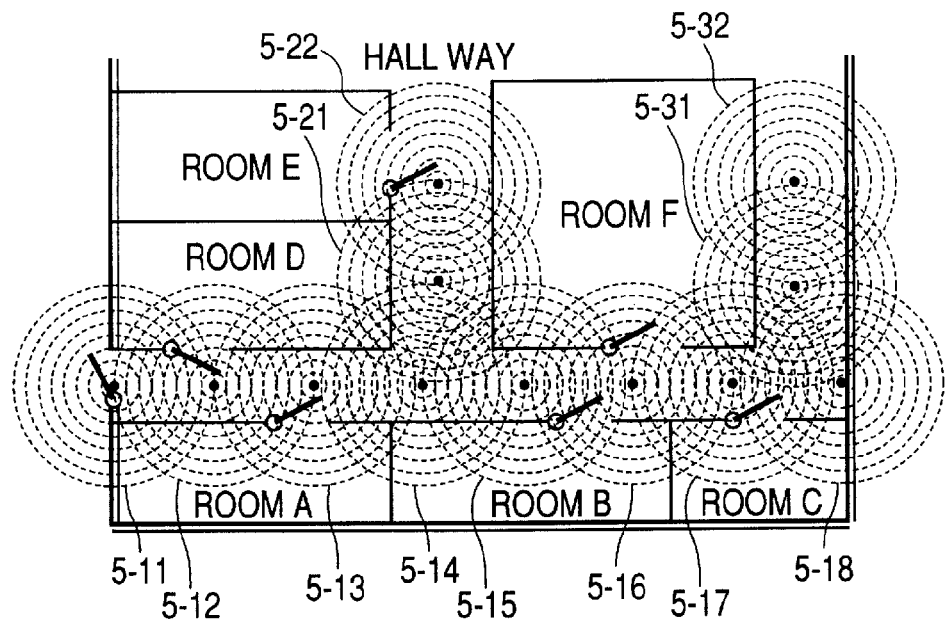
FIG. 33 is a view showing an embodiment of a positional data system where plural light source modules are mounted on a ceiling of a building to guide a person to a desired position.

FIG. 33 is a view showing an embodiment of a positional data system for guiding a person to a desired location by plural light source modules mounted on the ceiling of a building. As shown in FIG. 33, interference patterns (5-11, 5-12, ... 5-32) projected on the floor of a hallway communicating with respective rooms (Rooms A to F) from light source modules mounted on the ceiling of the building. The light source modules are assigned ID numbers 5-11, 5-12, ..., 5-32 and the respective light source modules illuminate in different pulse illumination patterns in accordance wit the ID numbers.

Figure 34:
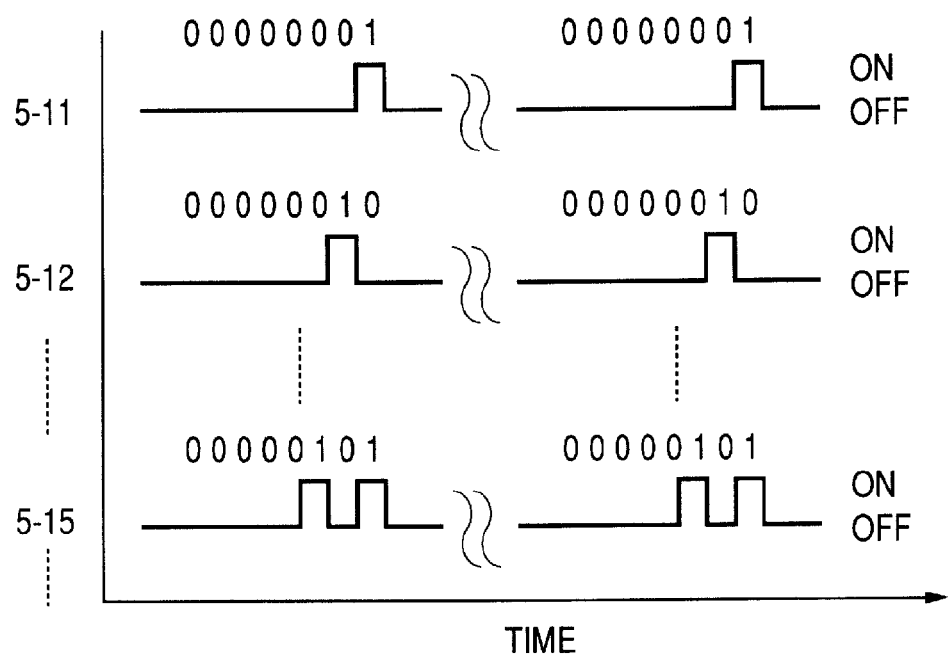
FIG. 34 is a view showing an example of a light emission pulse pattern of the laser light source.

FIG. 34 is a view showing an example of an illumination pulse pattern of the laser light source. As shown in, e.g., FIG. 34, a pulse ON is taken as 1, and a pulse OFF is taken as OFF. A light source module 5-11 repeatedly illuminates at eight bits (00000001). A light source module 5-15 repeatedly illuminates at eight bits (00000101). Thus, the pulse illumination pattern is associated with the light source module ID, so that the sensor can identify the light source module. In the case of eight bits, 256 illumination modules can be identified. In this case, it is better to illuminate the light source module while the illumination timing of the module is offset so as to prevent occurrence of crosstalk of the signal. A method for utilizing illumination frequencies can also be employed as a method for assigning ID numbers to the light source modules. So long as unique frequencies, such as 1 kHz or 2 kHz, have been assigned to the respective light source modules in advance, a frequency detector can distinguish respective frequencies from each other without offsetting the illumination timings.

When an image sensor is used as the sensor, the image photographing speed is comparatively low and usually 30 frames/second or thereabouts. Therefore, in the present embodiment, a high-speed light-receiving element capable of receiving a signal 100,000 times per second is attached beside the image sensor. By this light-receiving element, an optical signal emitted by high-speed pulses can be sufficiently distinguished.

The ID numbers of the light source modules and the positions of the modules within the room are input to the computing device beforehand. As a result, rough positional information can be grasped from the pulse illumination pattern detected by the sensor. High-accuracy positional information acquired from the concentric interference patterns are further added to the positional information, whereby the location of the light source module in the entire building can be ascertained accurately.

The positional information system can be utilized for a position guidance system. For instance, a person carries a sensor, and voice guidance pertaining to a direction in which the person is to walk to a desired room can be offered to the person on the basis of the detected positional information. A display device can be attached to the sensor as a guidance unit, and guidance can be offered by a map. Moreover, a vibrator is attached to the sensor, thereby embodying a unit to inform the person of an offset from a target location by vibration.

The foregoing positional information system can also be utilized as a device for guiding a robot to a target location. The sensor for detecting concentric interference patterns is mounted on the head of a robot, so that the robot can readily ascertain its own position in a building. Thereby, the robot can reach the target location. Even when plural robots are present, these robots can ascertain their own locations by the method of the present invention. Hence, the robots can perform a cooperated operation without contacting each other. Alternatively, the sensor may be provided at a target location, and the position may be informed to the robot by a radio communication function, thereby causing the robot to move to the target location with high accuracy. Moreover, a robot can also be caused to transport a baggage to a target location where the sensor is disposed.

Thirteenth Embodiment

Figure 35:
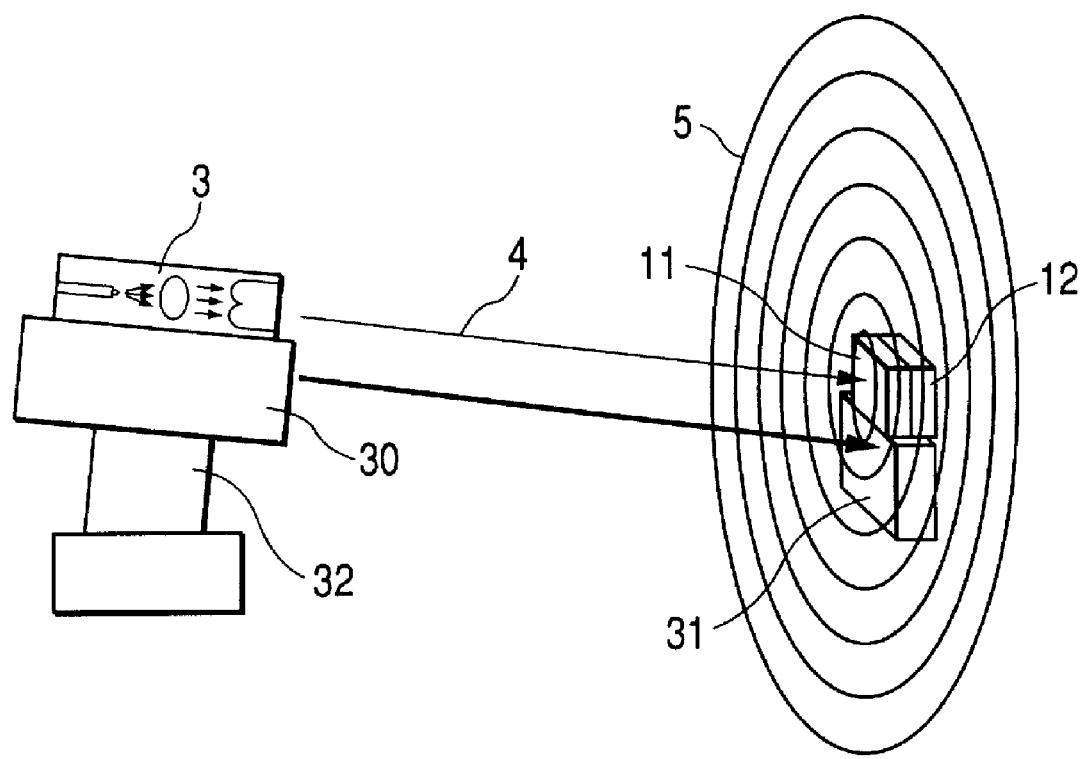
FIG. 35 is a view showing an embodiment of an optical space communication system where the optical axis of the light source module determines a transmission direction.

FIG. 35 is a view showing an embodiment of an optical space communication system where the optical axis of the light source module determines a light transmission direction. As shown in FIG. 35, in optical space communication of the present embodiment, an optical transmitter 30 transmits an optical signal by determining the orientation of an optical receiver 31. The light source module 3 is mounted on the optical transmitter 30 such that the light transmission direction of the optical transmitter 30 coincides with the optical axis 4 of the light source module. The optical transmitter 30 is provided on an angle adjustment device 32 capable of freely adjusting an angle. The optical receiver 31 is provided with the sensor 11 for detecting concentric interference patterns. The computing device 12 computes the distance from the center of the concentric circles to the optical receiver 31, and the result of computation is fed back to the angle adjustment device 32 by way of a unit, such as radio communication. The light transmission direction of the optical transmitter 30 is made to coincide with the position of the optical receiver 31. Optical space communication from the optical transmitter 30 to the optical receiver 31 is effected. According to the present embodiment, since the direction of optical communication can be caused to coincide with the optical axis 4 of the light source module. Hence, the light transmission direction can be very readily determined with high accuracy.

In the embodiment, the optical axis of the light source module is used as a unit to determine the light transmission direction in optical space communication. However, the optical axis of the light source module can also be utilized for a unit for alignment required during assembly of components or a unit to set a direction in a game.

The lens surface can be formed from an aspheric surface expressed by a polynomial and can assume a toroidal convex surface or a ring-shaped concave surface. The lens surface can be expressed by a polynomial $x=a*(y-b)\char`\^n+c$, $-4<n<4$ (a, b, c, and n denote real numbers, and $\char`\^$ denotes an exponent) along a cross sectional surface (an x-y plane) within a plane passing through the optical axis (x axis). The polynomial can employ $1<n<2$. The lens surface can have a maximum point and a minimum point of the polynomial on an optical axis and a rim of the lens.

The optical lens system can be further provided with a furcation unit to furcate light emitted from the light source into plural beams. The furcation unit is, for instance, a conical lens. The optical lens system can be further formed from an inner lens disposed close to the optical axis and an outer lens disposed outside the optical axis. Moreover, the light emitted from the light source can pass through three different optical paths by the inner lens and the outer lens. The optical lens system can further be provided with a polygonal entrance or exit plane centered on the optical axis. Pitches of the interference patterns can be set so as to become substantially equal to each other.

The sensor can be positioned at right angles to the optical axis of the optical lens system so as to detect concentric interference patterns. The sensor can be positioned obliquely with respect to the optical axis of the optical lens so as to detect multiple-oval-shaped interference patterns. The center of the concentric shape or the center of the multiple-oval shape is computed from a curvature of the interference pattern. The three-dimensional position of the light source can be computed from a curvature of the interference patterns and a pitch between the interference patterns. Moreover, the light source can be provided in a number of two or more, the respective light sources emit pulses as unique modulated signals, the sensor can detect the modulated signals unique to the pulse emissions, to thus distinguish the respective interference patterns from each other, and the computing device can compute the positions of the light sources and the positions of the interference patterns while distinguishing the positions from each other.

The sensor has a light-receiving section for detecting modulated signals unique to the pulse emissions, and the computing device can compute the positions of the light sources and the positions of the interference patterns while distinguishing the positions from each other. The sensor can be provided with light-receiving arrays arranged vertically and horizontally. The light source can be provided in a number of two or more, the respective light sources have unique emission wavelengths, the sensor can detect the emission wavelengths, to thus distinguish the interference patterns from each other, and the computing device can compute the positions of the light sources and the positions of the interference patterns while distinguishing the positions from each other. Further, the light source can be provided in a number of two or more, and the computing device can trace the detection signals at the moment at which the sensor has detected the positions of the light sources, distinguish the interference patterns from each other by tracing, and compute the positions of the light sources and the positions of the interference patterns while distinguishing the positions from each other. The sensor has a lens and can detect an interference pattern in an area which is larger than the light-receiving section of the sensor. The light source and the optical lens system can be formed as a light source module, the interference patterns can be projected from the light source module, and the projected interference patterns can be detected by the sensor, to thus measure the position of at least one of the light source module, the sensor, and the computing device.

The dimension of a contour of the object is measured by the light source module pointing at, e.g., plural points on a contour of a certain object. The dimension of the contour of the object is measured by the light source module pointing at the contour of the certain object so as to outline the same. The object is, e.g., a display device, and the sensor disposed in the vicinity of the object detects the interference patterns, thereby marking the position at which the light source module points. Moreover, the object is a display connected to a computer or a display area of a projected image, and the sensor disposed in the vicinity of the object detects the interference patterns and moves a cursor to the position at which the light source module points.

Switches corresponding to right and left clicks of a mouse are provided on the light source module, and the switches can be actuated in the manner of a mouse cursor by the light source module. The sensor is provided at two or more locations featuring the display area, to thus enable specification of the display area. The computing device can measure the position of the light source module from the position of the common center of the interference patterns and a concentric pitch between the interference patterns. The light source module uses the optical lens in which concentric circles or concentric ovals of the interference pattern are formed at substantially equal pitches, and the position of the light source module can be measured by utilization of the pitch of the concentric circles being changed substantially in proportion to a distance between the light source module and the object.

An object on which the interference pattern is projected is, e.g., a display connected to a computer or a display area in which an image is to be projected, and the sensor disposed in the vicinity of the object can detect the interference pattern, move a cursor to a position at which the light source module points, measure the position of the light source module, and record the position of the cursor and the position of the light source module.

The light source modules are mounted indoors, for instance, and positional information about the moving object can be acquired by attaching the sensor to the moving object. The light module can be provided indoors in the number of two or more, the light source modules can respectively emit pulses as unique modulated signals, the sensor can detect the unique modulated pulse emissions, and the computing device can distinguish the light source modules from each other, to thus acquire indoor positional data pertaining to the moving object. The light module can be provided indoors in a number of two or more, the light source modules can respectively emit light having unique wavelengths, the sensor can receive the light while distinguishing the unique wavelengths from each other, and the computing device can distinguish the light source modules from each other, thereby acquiring indoor positional data pertaining to the moving object.

The light module is provided in a number of two or more on a ceiling or wall surface of a room, and the light source modules each can have a guidance device for guiding the moving object to a target position on the basis of positional data pertaining to the moving object. The moving object is a delivery device for delivering an article, and the delivery device can deliver an article to a target position on the basis of the positional data. The guidance device has a display device and can display a map on the display device. The guidance device has a mechanical vibration section, and the moving object can be guided by vibrating the mechanical vibration section. The light source module is mounted indoors, and the computing device can compute a direction and distance to the light source module.

The optical receiver is provided on the sensor, the optical transmitter is provided in the light source module, and there can be provided an angle adjustment device for adjusting an angle of an optical signal developing in the optical transmitter such that the position of the optical receiver comes to the center position of the concentric interference patterns.

The concentric interference patterns include substantially-concentric interference patterns and further include interference patterns analogous to a circle or an oval as well as circular or oval interference patterns.

Advantage of the Invention

According to the present invention, an optical lens system for effecting positional measurement utilizing interference of light can be obtained at low cost with a simple configuration, along with a positional measurement system using this optical lens system. The position and direction of the light source module and the position and direction of an object having the light source module attached thereon can be measured in a simple manner at low cost and with a simple configuration. The location at which a pointer points can be measured with high accuracy by utilizing the light source module as a pointer. The dimension and position of the object at which the pointer points can be measured readily at low cost and with a simple configuration. Moreover, a high-precision positional data system can be constructed by mounting a light source module on the ceiling and carrying a sensor. Although the present invention utilizes interference of light, a clear image of optical interference pattern can be formed at all times regardless of a distance. Hence, the present invention yields an advantage of obviating a necessity for a focusing mechanism.

INDUSTRIAL APPLICABILITY

The present invention relates to an optical lens system suitable for forming concentric interference patterns, as well as to a positional measurement system which measures a one-dimensional, two-dimensional, or three-dimensional position of an object by utilization of a concentric interference pattern. Thus, the present invention has potential for industrial application.

What is claimed is:

1. An optical lens system comprising:
   a first lens to render light emitted from a light source parallel to an optical axis; and
   a second lens including a surface having a curvature radius which continuously changes an outgoing direction of light passing through an area of the second lens from the optical axis to a rim of the second lens.

2. The optical lens system according to claim 1, where in the surface is formed from an aspheric surface expressed by a polynomial.

3. The optical lens system according to claim 1, wherein the surface has a toroidal convex surface.

4. The optical lens system according to claim 1, wherein the surface is a ring-shaped concave surface.

5. The optical lens system according to claim 1,
   wherein the surface is expressed by a polynomial $x=a*(y-b)^{\wedge}n+c$, $-4<n<4$ along a cross sectional surface within a plane which perpendicularly intersects the plane through which the optical axis passes, a, b, c, and n denote real numbers, $^\wedge$ denotes an exponent, the cross sectional surface is an x-y plane, and the optical axis is x axis.

6. The optical lens system according to claim 5, wherein the polynomial employs $1<n<2$.

7. The optical lens system according to claim 5, wherein the surface has a maximum point and a minimum point of the polynomial on an optical axis or a rim of the second lens.

8. The optical lens system according to claim 1, further comprising: a furcation unit that furcates light emitted from the light source into a plurality of beams.

9. The optical lens system according to claim 8, wherein the furcation unit is a conical lens.

10. The optical lens system according to claim 1, wherein the second lens includes an inner lens disposed close to the optical axis, and an outer lens disposed outside the optical axis.

11. The optical lens system according to claim 10, wherein light emitted from the light source passes through three different optical paths by the inner lens and the outer lens.

12. The optical lens system according to claim 1, further comprising: a polygonal entrance or exit plane centered on the optical axis.

13. The optical lens system according to claim 1, further comprising a light source unit that functions as the light source,
   wherein the first lens is provided between the light source unit and the second lens.

14. The optical lens system according to claim 1, wherein the second lens forms concentric interference patterns on an object as if light emitted from a single light source were virtually emitted from two or more light sources within a plane containing an optical axis of the single light source.

* * * * *